(12) United States Patent
Wolter et al.

(10) Patent No.: US 10,840,669 B2
(45) Date of Patent: Nov. 17, 2020

(54) RADIATION FIELD AMPLIFIER SYSTEM

(71) Applicant: Universitaet Stuttgart, Stuttgart (DE)

(72) Inventors: Jan-Hinnerk Wolter, Kornwestheim (DE); Andreas Voss, Essen (DE)

(73) Assignee: Universitaet Stuttgart, Stuttgart (DE)

( * ) Notice: Subject to any disclaimer, the term of this patent is extended or adjusted under 35 U.S.C. 154(b) by 0 days.

(21) Appl. No.: 15/727,778

(22) Filed: Oct. 9, 2017

(65) Prior Publication Data

US 2018/0219348 A1 Aug. 2, 2018

(30) Foreign Application Priority Data

Oct. 17, 2016 (EP) ................... 16194176

(51) Int. Cl.
*H01S 3/06* (2006.01)
*H01S 3/04* (2006.01)
(Continued)

(52) U.S. Cl.
CPC ........... *H01S 3/0627* (2013.01); *H01S 3/025* (2013.01); *H01S 3/042* (2013.01); *H01S 3/0405* (2013.01);
(Continued)

(58) Field of Classification Search
CPC ... H01S 3/0405; H01S 5/02469–02492; H01S 3/042; H01S 3/0604;
(Continued)

(56) References Cited

U.S. PATENT DOCUMENTS 4,151,547 A * 4/1979 Rhoades ............. H01L 23/3736
165/185
4,611,238 A * 9/1986 Lewis ................. H01L 23/3672
174/16.3
(Continued)

FOREIGN PATENT DOCUMENTS

DE 102014100204 2/2015
JP 02005584 A * 1/1990 ............. H01S 3/042
(Continued)

OTHER PUBLICATIONS

Liao et al., Pressure Tuning of Thermal Lensing for High-Power Scaling, Optical Society of America, Oct. 1, 1999, vol. 24, No. 19, XP-000873636, 3 pages.
(Continued)

*Primary Examiner* — Joshua King
(74) *Attorney, Agent, or Firm* — Lipsitz & McAllister, LLC

(57) ABSTRACT

Radiation field amplifier system for a radiation field comprising an amplifying unit and a heat dissipation system with one heat spreading element or several heat spreading elements, said one heat spreading element or at least one of said several heat spreading elements of said heat dissipation system is pressed with a contact surface within a contact area against said amplifying unit and said contact surface rises starting from a geometrical reference plane in direction towards said amplifying unit and a distance d between said contact surface and said geometrical reference plane attains its largest value within a central area, which is arranged inside said contact area and said distance d is smaller outside said central area than inside said central area.

40 Claims, 10 Drawing Sheets

(51) Int. Cl.
*H01S 3/23* (2006.01)
*H01S 3/02* (2006.01)
*H01S 3/042* (2006.01)
*H01S 3/0941* (2006.01)
*H01S 3/10* (2006.01)
*H01S 3/08* (2006.01)
*H01S 3/00* (2006.01)

(52) U.S. Cl.
CPC ........ *H01S 3/0604* (2013.01); *H01S 3/09415* (2013.01); *H01S 3/2308* (2013.01); *H01S 3/005* (2013.01); *H01S 3/08072* (2013.01); *H01S 3/10023* (2013.01)

(58) Field of Classification Search
CPC .......................... H01S 3/08072–08077; H01L 2023/4037–4068; H05K 2201/10598
See application file for complete search history.

(56) References Cited

U.S. PATENT DOCUMENTS

| | | | |
|---|---|---|---|
| 4,848,881 A | 7/1989 | Kahan et al. | |
| 5,363,391 A * | 11/1994 | Matthews | G02F 1/37 372/36 |
| 5,563,899 A | 10/1996 | Meissner et al. | |
| 5,974,061 A * | 10/1999 | Byren | H01S 3/0941 372/34 |
| 6,125,129 A * | 9/2000 | Naegele | H01S 3/109 372/103 |
| 6,134,258 A * | 10/2000 | Tulloch | H01S 3/0606 372/36 |
| 6,156,219 A | 12/2000 | Shimoji | |
| 6,385,220 B1 | 5/2002 | Miller et al. | |
| 2004/0084764 A1 * | 5/2004 | Ishimine | H01L 23/4006 257/706 |
| 2005/0286577 A1 * | 12/2005 | Fork | H01S 3/07 372/34 |
| 2006/0083276 A1 * | 4/2006 | Brown | H01S 3/042 372/36 |
| 2006/0114951 A1 * | 6/2006 | Chou | H01S 3/042 372/33 |
| 2007/0238219 A1 * | 10/2007 | Bennett | H01S 3/042 438/106 |
| 2008/0089372 A1 * | 4/2008 | Izawa | H01S 3/042 372/36 |
| 2008/0247425 A1 * | 10/2008 | Welford | H01S 3/042 372/10 |
| 2012/0002263 A1 | 1/2012 | Furuya et al. | |
| 2012/0105948 A1 | 5/2012 | Bayramian et al. | |
| 2012/0165801 A1 * | 6/2012 | Bragagna | A61B 18/20 606/16 |
| 2013/0336347 A1 * | 12/2013 | Aubry | H01S 3/025 372/34 |
| 2014/0376581 A1 * | 12/2014 | Stolzenburg | H01S 3/04 372/36 |
| 2016/0072252 A1 * | 3/2016 | Ota | H01S 5/02276 372/44.01 |
| 2017/0256904 A1 * | 9/2017 | Aspelmeyer | H01S 5/02469 |
| 2018/0175580 A1 | 6/2018 | Yu et al. | |

FOREIGN PATENT DOCUMENTS

| | | | | |
|---|---|---|---|---|
| JP | 2017157647 A * | 9/2017 | ............. | H01S 3/042 |
| WO | WO-2017162621 A1 * | 9/2017 | ......... | H01S 3/10013 |

OTHER PUBLICATIONS

Van Loon et al., Intracavity Diamond Heatspreaders in Lasers: The Effects of Birefringence, Optical Society of America, Oct. 2, 2006, vol. 14, No. 20, 11 pages.

Starobor et al.; "Peculiarity of the thermally induced depolarization and methods of depolarization compensation in square-shaped Yb:YAG active elements"; Optics Communications; 2017; pp. 468-471; vol. 402.

* cited by examiner

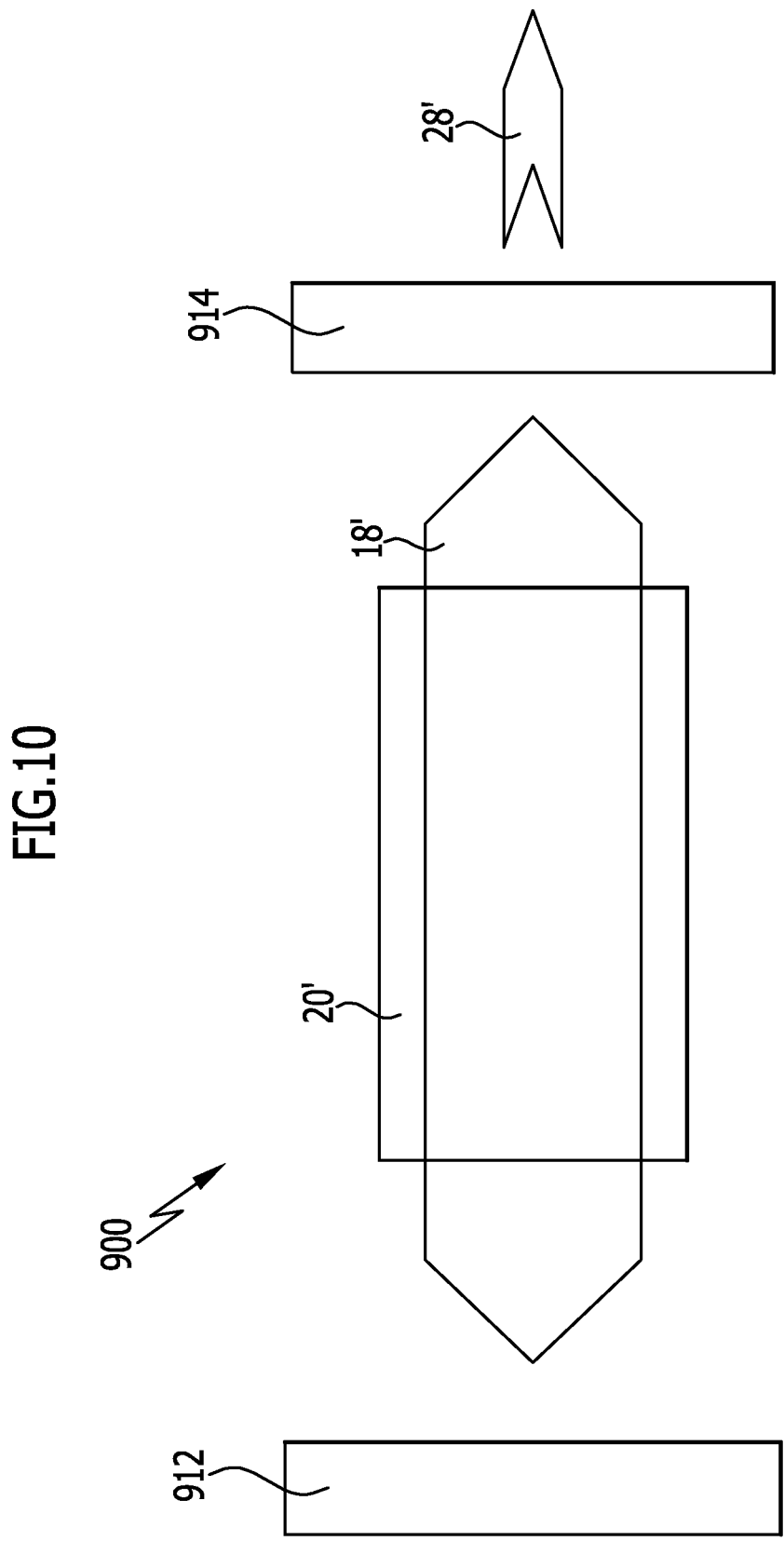

RADIATION FIELD AMPLIFIER SYSTEM

This patent application claims the benefit of European application No. 16 194 176.0, filed Oct. 17, 2016, which is incorporated herein by reference in its entirety and for all purposes.

BACKGROUND OF THE INVENTION

The invention relates to a radiation field amplifier system for a radiation field comprising an amplifying unit and a heat dissipation system with one heat spreading element or several heat spreading elements.

Radiation field amplifier systems showing the aforementioned features are known from the prior art.

It is the object of the present invention to improve an operation of such a radiation field amplifier system.

SUMMARY OF THE INVENTION

This object is solved by a radiation field amplifier system as defined above in which said one heat spreading element or at least one of said several heat spreading elements of said heat dissipation system is pressed with a contact surface within a contact area against said amplifying unit and said contact surface rises starting from a geometrical reference plane in direction towards said amplifying unit and a distance d between said contact surface and said geometrical reference plane attains its largest value within a central area, which is arranged inside said contact area and said distance d is smaller outside said central area than inside said central area.

One advantage of the present invention has to be seen in the fact that a heat conductance between said amplifying unit and said one heat spreading element or said at least one heat spreading element is increased and accordingly an efficiency of cooling of said amplifying unit by said heat dissipation system is increased.

Due to the increased cooling efficiency, amplifying units with higher heat losses can be used in said radiation field amplifier system and the efficiency of said radiation field amplifier system is increased.

Another advantage of the present invention is that an interface between said amplifying unit and said one heat spreading element or said at least one heat spreading element, which is pressed against said amplifying unit, is smoother and distortions between said amplifying unit and said heat spreading element are reduced.

With respect to said radiation field no further details have been given so far.

For example said radiation field is a laser beam.

In particular, said radiation field is a pulsed radiation field, for example a pulsed laser beam.

In another embodiment, an intensity of said radiation field is continuous in time.

Said radiation field has a wave length L.

Said wave length L of said radiation field is for example larger than 400 nm, preferably larger than 500 nm, for example larger than 600 nm, in particular larger than 700 nm.

Preferably, said wave length L of said radiation field is smaller than 3.000 nm, advantageously smaller than 2.500 nm, for example smaller than 2.000 nm, in particular smaller than 1.500 nm.

In a particular advantageous embodiment, said radiation field enters said radiation field amplifier system essentially linearly polarized with an initial polarization direction P.

An advantageous embodiment provides, that said radiation field exits said radiation field amplifier system essentially linearly polarized in said initial polarization direction P, with said radiation field being essentially linearly polarized in said initial polarization direction P in particular if a component of said radiation field, which is polarized perpendicular to said initial polarization direction P, contributes less than 5%, for example less than 2% advantageously less than 0.5% to said radiation field.

According to an advantageous embodiment, said radiation field amplifier system comprises a first optical device and a second optical device.

In particular, said radiation field penetrates said first optical device, said amplifying unit and said second optical device in this order.

In principle, said optical devices can be built in various ways.

In particular at least one of said optical devices is part of said heat dissipation system, for example said first optical device is and/or said second optical device is, at least partly, part of said heat dissipation system.

Accordingly, said at least one of said optical devices, which is part of said heat dissipation system, advantageously fulfills several functions and elements to build said radiation field amplifier system can be saved.

An advantageous embodiment provides, that the elements of said optical devices comprise a material which is for said radiation field transparent.

In particular, the elements of said optical devices comprise a material, which is in an unloaded state optical isotropic.

In particular, said unloaded state is an unpressed state and/or a stress free state and/or a state in which no external forces, for example exerted by a mounting system, are acting and/or an unheated state, for example a state at room temperature, and/or a radiation free state, in particular a state without said radiation field and/or without a pumping radiation field.

For example, said optical devices act birefringently on said radiation field and in particular said birefringence in at least one of said first and second optical devices is induced by stress and/or thermal gradients within said at least one optical device.

In particular, a depolarization of said radiation field in at least one of said optical devices is caused by thermal and/or stress induced birefringence.

A preferable embodiment provides, that at least one of said optical devices is rotational symmetric to a main axis, for example said first optical device is rotational symmetric to a first main axis and/or said second optical device is rotational symmetric to a second main axis.

In particular, said first and second main axes are essentially parallel with said axes being essentially parallel if an angle between said axes is smaller than 3°, in particular smaller than 1°, advantageously smaller than 0.5°.

In particular a direction of penetration of said radiation field is essentially parallel to an axial direction of at least one of said main axes, for example of said first axis and/or said second axis, with said directions being essentially parallel if an angle between said directions is smaller than 3°, preferably smaller than 1°, for example smaller than 0.5°.

Advantageously, said first optical device is and/or said second optical device is rotational symmetric to an optical axis of said radiation field amplifier system.

In principle, said optical devices can comprise transitive and reflective elements.

An advantageous embodiment provides, that said radiation field penetrates all elements of at least one of said optical devices, in particular all elements of said first and said second optical devices, only in transmission.

Therefore, there is no need for highly reflective layers, which are thicker than anti-reflection layers and have accordingly a higher thermal resistance, which is undesirably.

In principle, said first optical device and said second optical device can be build and/or arranged differently and/or can have different features.

An advantageous embodiment however provides, that said first optical device and said second optical device are build and/or arranged analogously, such that distortions to said radiation field, which occur in said optical devices, for example depolarizations of said radiation field, are similar in both of said optical devices.

In particular, said optical devices are aligned symmetrically to each other, in particular with respect to a plane of symmetry, which runs transverse to said optical axis of said radiation field amplifier system.

In particular, an optical path length through one of said optical devices depends on the polarization of the radiation field penetrating said one optical device.

In particular, optical path lengths through at least one of said optical devices are for two components of said radiation field, which are polarized perpendicular to each other, different.

For example there is a difference between an optical path length for one component of said radiation field through said first optical device and an optical path length for another component of said radiation field, which is polarized perpendicular to said aforementioned component of said radiation field, through said first optical device.

For example there is a difference between an optical path length for one component of said radiation field through said second optical device and an optical path length for another component of said radiation field, which is polarized perpendicular to said aforementioned component of said radiation field, through said second optical device.

In a preferred embodiment a difference of said optical path length of two components of said radiation field, which are polarized perpendicular to each other, is essentially the same in said first optical device and in said second optical device, with said difference in said first optical device and said difference in said second optical device being essentially the same, if said differences are the same or deviate from each other by at most 10%, in particular by at most 5%, preferably by at most 1%.

The advantage of said essentially same differences of said optical path lengths is, that the two different components of said radiation field acquire essentially the same phase shift in both of said optical devices and therefore the compensation of the depolarizations occurring in both of said optical devices is enhanced.

In particular said two components of said radiation field, which are polarized perpendicular to each other, are exposed to different refractive indices, which differ with respect to their values, in said first optical device.

In particular said two components of said radiation field, which are polarized perpendicular to each other, are exposed to different refractive indices, which differ with respect to their values, in said second optical device.

Preferably said differences in refractive indices, to which said two components of said radiation field, which are polarized perpendicular to each other, are exposed, in said first optical device and in said second optical device are essentially the same, with said differences being essentially the same, if said differences are the same or deviate from each other by at most 10%, in particular by at most 5%, preferably by at most 1%.

Accordingly, said depolarizations of said radiation field occurring in said first optical device and in said second optical device are essentially the same and preferably said compensation of said depolarizations is enhanced.

In particular, at least one of said optical devices, for example said first optical device and/or said second optical device, is mechanically subjected to a force.

For example said force, to which said at least one of said optical devices is subjected, is exposed by a mounting system, for example to fix a position of said at least one optical device and/or to press said at least one optical device against said amplifying unit.

An advantageous embodiment provides that said force, to which said at least one of said optical devices is subjected, is applied rotationally symmetrical to said main axis, for example to said first main axis and/or said second main axis, such that a stress induced birefringence of said at least one of said optical devices is also rotationally symmetrical to said main axis.

Preferably, said force, to which said at least one of said optical devices is subjected, is applied rotationally symmetrical to said optical axis of said radiation field amplifier system.

For example, said force, to which said first optical device is subjected, is applied rotationally symmetrical to said first main axis, preferably in axial direction with respect to said first main axis.

In particular, said force, to which said second optical device is subjected, is applied rotationally symmetrical to said second main axis and preferably in axial direction with respect to said second main axis.

An advantageous embodiment provides, that a strength of the force, to which at least one of said optical devices is subjected, for example the strength of the force to which said first optical device is subjected and/or the strength of the force to which said second optical device is subjected, is adjusted to increase, in particular to optimize, the efficiency of said radiation field amplifier system.

Factors of influence on the efficiency of said radiation field amplifier system, which are affected by said strength of the force, to which at least one of said optical devices is subjected, are for example one or more of the following: Diffraction losses in said radiation field and/or stress induced birefringence in said optical devices and/or interfacial properties between said pressed optical device and said amplifying unit.

For example, said force, to which said at least one of said optical devices is subjected, is larger than 5 Newton, in particular larger than 10 Newton, preferably larger than 20 Newton.

For example, said force, to which said at least one of said optical devices is subjected, is smaller than 1.000 Newton, in particular smaller than 800 Newton, preferably smaller than 500 Newton.

An advantageous embodiment provides, that the strength of the force, to which said first optical device is subjected, is essentially the same as the strength of the force, to which said second optical device is subjected with the strengths of the forces being essentially the same if they differ with respect to each other by at most 5%, preferably by at most 2%, in particular by at most 0.5%.

Therefore, advantageously the stress induced birefringence in said first optical device and in said second optical device is essentially the same.

In principle, there are various ways to fix said optical devices and to load said optical devices.

For example at least one of said optical devices is fixed with a screw connection.

One embodiment provides, that said force, to which at least one of said optical devices is subjected, is exerted by said screw connection.

Preferably, said force, to which at least one of said optical devices is subjected, is exerted by a force exerting unit, with which a strength of said force is adjustable, in particular with which said force is adjustable during operation of said radiation field amplifier system.

Advantageously, the strength of said force, to which at least one of said optical devices is subjected, is held essentially constant at a desired strength, that is in particular that the strength of said force deviates from said desired strength by at most 10%, preferably by at most 5% in particular by at most 2%, advantageously by at most 0.5%.

Preferably, said force, to which at least one of said optical devices is subjected, is exerted by a piezoelectric element, with which advantageously said force is easily adjustable and fine tunable.

Another advantageous embodiment provides, that at least one of said optical devices is spring loaded, for example said first optical device is spring loaded and/or said second optical device is spring loaded.

For example, a spring of said mounting system loads said at least one of said optical devices.

Thereby the exerted force is better adjustable.

Furthermore said spring compensates changes in said at least one of said optical devices and/or said mounting system, for example a thermal expansion of an element, and consequently the exerted force is more balanced.

With respect to said amplifying unit no further details have been given so far.

Preferably, said amplifying unit comprises a solid body, which in particular is disc-like shaped, that is an extension B of said solid body within a geometrical disc plane is larger, for example four times larger, than a thickness E of said solid body across said geometrical disc plane.

Advantageously, said geometrical disc plane, in which said solid body mainly extends, runs transverse to said optical axis of said radiation field amplifier system.

In particular said geometrical disc plane, in which said solid body mainly extends, runs transverse to said direction of penetration of said radiation field.

In particular said thickness E of said solid body is, in particular in the unloaded state, larger than 20 micrometer, in particular larger than 40 micrometer.

For example said thickness E of said solid body is, in particular in the unloaded state, smaller than 1.000 micrometer, preferably smaller than 500 micrometer, advantageously smaller than 300 micrometer, in particular smaller than 280 micrometer.

In particular, said solid body of said amplifying unit comprises a laser active material.

For example said amplifying unit comprises titan.

In particular said amplifying unit comprises aluminum oxide, $Al_2O_3$.

For example said amplifying unit comprises sapphire, in particular titanium doped sapphire.

Preferably, said amplifying unit comprises yttrium aluminium garnet, $Y_3Al_5O_{12}$, in particular ytterbium doped and/or neodymium doped and/or thulium doped yttrium aluminum garnet.

For example, in a pumped state pumping energy is provided to that amplifying unit.

In particular, in pumping energy excites a laser active transition in said amplifying unit, in particular in said laser active material.

Advantageously, said radiation field is amplified by said amplifying unit, in particular by stimulated emission of said excited laser active transition.

Furthermore, said amplifying unit is heated by said pumping energy.

Preferably, said amplifier system comprises a source of a pumping radiation field and said pumping radiation field provides said pumping energy.

Preferably, said force exerting unit is capable to compensate for a thermal expansion of said amplifying unit and in particular to held the strength of the exerted force during operation of said amplifier system essentially constant, i.e., for example within a range of ±10%, preferably of ±5%, in particular of ±2%, advantageously of ±0.5% around the desired strength of the force.

For example, said amplifying unit acts birefringently on said radiation field.

Advantageously, said amplifying unit alters, in particular rotates and/or inverts, a polarization of said radiation field such that said depolarization of said radiation field occurring in said first optical device is essentially compensated by said depolarization of said radiation field occurring in said second optical device.

Accordingly, said depolarizations occurring in said first and second optical devices are essentially compensated, such that depolarization losses in said radiation field are reduced and consequently the efficiency of said radiation field amplifier system is enhanced.

Furthermore, in that embodiment no additional parts are required to compensate depolarizations in said radiation field.

Advantageously, a direction of rotation of polarization of said radiation field is reversed by said amplifying unit, in particular when said radiation field enters said amplifying unit elliptically polarized.

A preferred embodiment provides, that said amplifying unit inverts a phase shift between components of said radiation field, which are polarized parallel and perpendicular to said initial polarization direction P of said radiation field.

In particular, said amplifying unit, in particular said solid body, is intrinsic birefringent.

For example, said amplifying unit, in particular said solid body, has a polarization dependent refractive index n, with refractive index n acquires a value n1 for a radiation field, which is polarized in a direction U1 and refractive index n acquires a value n2, which differs from value n1, for a radiation field, which is polarized in a direction U2, and directions U1 and U2 being perpendicular to each other and to said optical axis of said radiation field amplifier system and in particular being perpendicular to said direction of penetration of said radiation field.

An advantageous embodiment provides, that said amplifying unit is designed as a half wave plate.

In particular, an optical path length through said amplifying unit for a radiation field depends on a polarization of said radiation field.

Preferably, optical path lengths through said amplifying unit for components of said radiation field, which are polarized parallel and perpendicular to said initial polarization direction P of said radiation field, differ essentially by an odd multiple of the half of said wave length L of said radiation field, that is said optical path lengths differ by an amount which equals (2m+1) L/2 or deviates from the value (2m+1) L/2 by at most ±L/6, in particular by at most ±L/10, advantageously by at most ±L/15 and where m is 0 or an integer, for example m equals 1 or m equals 2 or m equals 3.

Thereby the polarization of said radiation field is altered such, that said depolarizations, which occur in said first and second optical devices, are compensated in an advantageous way.

In particular, a value of said thickness E of said solid body satisfies essentially the equation (n1−n2) E=(2m+1)×L/2, with m being an integer, for example m equals 0 or m equals 1 or m equals 2 or m equals 3, and the value of said thickness E of said solid body satisfies essentially said equation if the value of said thickness E corresponds to the value given by said equation or differs from said value given by said equation by at most ±L/(6 n1−6 n2), preferably by at most ±L/(10 n1−10 n2), advantageously by at most ±L/(15 n1−15 n2).

With respect to said heat dissipation system no further details have been given so far.

For example said heat dissipation system comprises one heat spreading element.

Advantageously, said heat dissipation system comprises several heat spreading elements.

In a preferred embodiment said amplifying unit is clamped in between a first and a second heat spreading element of said heat dissipation system, and thereby for example these elements are held in their positions and in particular the heat conductance between said amplifying unit and said heat spreading elements is enhanced.

Advantageously, said heat spreading elements, which are pressed against said amplifying unit, in particular said first and said second heat spreading elements, are in thermal contact with one or more heat sinks and thereby advantageously heat is further conducted away from said amplifying unit.

Preferably said one or more heat sinks comprises/comprise one or more heat spreading elements and in particular a cooling system.

Preferably at least one heat spreading element comprises, in particular all heat spreading elements comprise, a heat conducting material with a thermal conductivity of at least 500 W/(m×K).

In particular, at least one heat spreading element comprises, preferably all heat spreading elements comprise, diamond, which can be polycrystalline diamond and preferably is monocrystalline diamond.

Preferably, at least one heat spreading element of said heat dissipation system is an element of one of said first and second optical devices, and accordingly in turn, said one of said first and second optical devices is at least partly part of said heat dissipation system.

In particular all heat spreading elements are elements of either said first optical device or said second optical device.

For example a first heat spreading element is an element of said first optical device and a second heat spreading element is an element of said second optical device.

An advantageous embodiment provides, that said radiation field penetrates at least one heat spreading element.

In particular, a region of penetration of said radiation field passes through the contact area within which said one heat spreading element or at least one of said several heat spreading elements is pressed against said amplifying unit.

For example, said radiation field passes through a surface of a second part of said one heat spreading element or one of said several heat spreading elements, in particular through a surface of a second part of said first heat spreading element and/or a surface of a second part of said second heat spreading element.

In particular, said at least one heat spreading element comprising said contact part and said second part is one piece, i.e., said contact part and said second part are preferably integrally formed as one piece.

In one embodiment said surface of said second part of said heat spreading element is essentially planar.

In another preferred embodiment, said surface of said second part of said heat spreading element is shaped to form the shape of said radiation field.

In particular, said surface of said second part of said heat spreading element is convex.

In another embodiment said surface of said second part of said heat spreading element is concave.

Preferably said surfaces of said second parts of said first and/or second heat spreading elements are convex and/or concave.

For example, said first heat spreading element is pressed within a first contact area against said amplifying unit and said second heat spreading element is pressed within a second contact area against said amplifying unit and said region of penetration of said radiation field passes through said first contact area and said second contact area.

In a preferred embodiment said first contact area between said first heat spreading element and said amplifying unit and said second contact area between said second heat spreading element and said amplifying unit are arranged on opposite sides of said amplifying unit, such that preferably said region of penetration of said radiation field passes through said first and second contact areas and said radiation field penetrates said first and second contact areas and thereby diffraction losses in said radiation field at an interface between said heat spreading elements and said amplifying unit are reduced.

Advantageously, in particular in the unloaded state, the distance d between the contact surface and the geometrical reference plane of said one heat spreading element or of at least one of said several heat spreading elements, in particular of said first heat spreading element and/or of said second heat spreading element, increases, in particular continuously, from an outer area of said heat spreading element towards the central area of said heat spreading element and said outer area surrounds said central area.

For example said first heat spreading element has a first contact surface and a first geometrical reference plane is associated to said first contact surface and said first contact surface rises from said first geometrical reference plane and, in particular in the unloaded state, a distance d1 between said first contact surface and said first geometrical reference plane of said first heat spreading element increases, in particular continuously, from a first outer area towards a first central area of said first heat spreading element and in particular said first outer area surrounds said first central area and advantageously said distance d1 attains its maximal value within said first central area.

For example said second heat spreading element has a second contact surface and a second geometrical reference plane is associated to said second contact surface and said second contact surface rises from said second geometrical reference plane and, in particular in the unloaded state, a distance d2 between said second contact surface and said second geometrical reference plane of said second heat spreading element increases, in particular continuously, from a second outer area towards a second central area of said second heat spreading element and in particular said second outer area surrounds said second central area and advantageously said distance d1 attains its maximal value within said second central area.

Preferably, in particular in the unloaded state, the distance d between the contact surface and the geometrical reference plane of said one heat spreading element or of at least one of said several heat spreading elements, for example said distance d1 between said first contact surface and said first geometrical reference plane of said first heat spreading element and/or said distance d2 between said second contact surface and the second geometrical reference plane of said second heat spreading element, increases, in particular continuously, upon decreasing a radial distance to said optical axis of said radiation field amplifier system.

For example, the distance d between the contact surface and the geometrical reference plane of said one heat spreading element or of at least one of said several heat spreading elements, for example said distance d1 between said first contact surface and said first geometrical reference plane of said first heat spreading element and/or said distance d2 between said second contact surface and the second geometrical reference plane of said second heat spreading element, increases, in particular in the unloaded state, stepwise.

In particular, the distance d between the contact surface and the geometrical reference plane of said one heat spreading element or of at least one of said several heat spreading elements, for example said distance d1 between said first contact surface and said first geometrical reference plane of said first heat spreading element and/or said distance d2 between said second contact surface and the second geometrical reference plane of said second heat spreading element, increases, in particular in the unloaded state, steadily.

In particular, said optical axis of said radiation field amplifier system runs through the central area of said one heat spreading element or through every central area of each of said several heat spreading elements.

Preferably, the central area of said one heat spreading element or of at least one of said several heat spreading elements, for example said first central area of said first heat spreading element and/or said second central area of said second heat spreading element, is arranged within the region of penetration of said radiation field.

Thereby an interface between said heat spreading element and said amplifying unit at said contact surface is shaped advantageously such, that diffraction losses in said radiation field when penetrating said interface are reduced.

In a preferred embodiment, the distance d between the contact surface and the geometrical reference plane of said one heat spreading element or of at least one of said several heat spreading elements in the contact area is smaller in a pressed state, i.e., when the considered heat spreading element, said contact surface and said geometrical reference plane of which are considered, is pressed against said amplifying unit, than in an unpressed state of said considered heat spreading element.

In particular, said distance d1 between said first contact surface and said first geometrical reference plane of said first heat spreading element in said first contact area is smaller in the pressed state, i.e., when said first heat spreading element is pressed against said amplifying unit, than in an unpressed state of said first heat spreading element.

In particular, said distance d2 between said second contact surface and said second geometrical reference plane of said second heat spreading element in said second contact area is smaller in the pressed state, i.e., when said second heat spreading element is pressed against said amplifying unit, than in an unpressed state of said second heat spreading element.

Furthermore, in said pumped state said amplifying unit, in particular said solid body, expands due to thermal expansion and said amplifying unit and said one or at least one heat spreading element, in particular said first heat spreading element and/or said second heat spreading element, are pressed against each other.

Preferably, the distance d between the contact surface and the geometrical reference plane of said one heat spreading element or of at least one of said several heat spreading elements in the contact area is smaller in the pumped state than in the unpumped state.

In particular, said distance d1 between said first contact surface and said first geometrical reference plane of said first heat spreading element in said first contact area is smaller in the pumped state than in the unpumped state.

In particular, said distance d2 between said contact surface and said second geometrical reference plane of said second heat spreading element is in said second contact area smaller in the pumped state than in the unpumped state.

In some embodiments it is provided, that in the pressed state and/or pumped state, in particular in a state when it is pressed and pumped, the distance d between the contact surface and the geometrical reference plane of said one heat spreading element or of at least one of said several heat spreading elements partly increases and partly decreases upon increasing the radial distance from said optical axis of said amplifier system.

In particular, said distance d1 between said first contact surface and said first geometrical reference plane of said first heat spreading element partly increases and partly decreases upon increasing the radial distance from said optical axis of said amplifier system in the pressed state and/or pumped state, in particular in a state, when it is pressed and pumped.

In particular, said distance d2 between said second contact surface and said second geometrical reference plane of said second heat spreading element partly increases and partly decreases upon increasing the radial distance from said optical axis of said amplifier system in the pressed state and/or in the pumped state, in particular in a state, when it is pressed and pumped.

Thereby advantageously distortions between said heat spreading element and said amplifying unit at said contact surface are reduced and accordingly the heat conductance between said heat spreading element and said amplifying unit is enhanced and diffraction losses in said radiation field when penetrating through said contact surface are reduced.

In principle, the geometrical reference plane of the one heat spreading element or the geometrical reference planes of the several heat spreading elements can be aligned in various different ways.

Preferably, the geometrical reference plane of said one heat spreading element or of at least one heat spreading element of said several heat spreading elements, in particular said first geometrical reference plane and/or said second geometrical reference plane, runs essentially perpendicular to said optical axis of said radiation field amplifier system, in particular an angle between said geometrical reference plane and said optical axis differs from 90° by at most ±3°, preferably by at most ±1°, in particular by at most ±0.5°, advantageously by at most ±0.1°.

For example, the geometrical reference plane of said one heat spreading element or of at least one heat spreading element of said several heat spreading elements, in particular said first geometrical reference plane and/or said second geometrical reference plane, runs essentially parallel to said geometrical disc plane of said solid body, within which said solid body essentially extends, in particular an angle between said geometrical reference plane and said geometrical disc plane is smaller than 3°, in particular smaller than 1°, advantageously smaller than 0.5°.

There are various ways in which the contact surface of said one heat spreading element or of at least one heat spreading element of said several heat spreading elements can rise over the geometrical reference plane of said heat spreading element.

For example the contact surface of said one heat spreading element or of at least one heat spreading element of said several heat spreading elements is stepped.

Advantageously, the contact surface of said one heat spreading element or of at least one heat spreading element of said several heat spreading elements, in particular said first contact surface and/or said second contact surface, is curved, in particular convex curved, with a radius Q of curvature of said contact surface being, in particular in the unloaded state, larger than 0.5 meter, preferably larger than 2 meter, in particular larger than 10 meter.

Advantageously, the contact surface of said one heat spreading element or of at least one heat spreading element of said several heat spreading elements, for example said first contact surface and/or said second contact surface, is curved, in particular convex curved, with the radius Q of curvature of said contact surface being, in particular in the unloaded state, smaller than 50 meter, advantageously smaller than 40 meter, preferably smaller than 30 meter.

In a preferred embodiment the radii Q of curvature of the contact surfaces of at least two heat spreading elements, for example of said first and said second contact surfaces, in particular of the contact surfaces of all heat spreading elements, differ with respect to each other, in particular in the unloaded state, by at most 10%, in particular by at most 5%, preferably by at most 2%.

An advantageous embodiment provides, that an extension C, which is measured transverse to said optical axis of said radiation field amplifier system, of said one heat spreading element or of at least one heat spreading element of said several heat spreading elements, in particular of said first heat spreading element and/or of said second heat spreading element, is, in particular in the unloaded state, larger than 5 mm, preferably larger than 10 mm, in particular larger than 20 mm.

In particular, the extension C which is measured transverse to said optical axis of said radiation field amplifier system of said one heat spreading element or of at least one heat spreading element of said several heat spreading elements, in particular of said first heat spreading element and/or said second heat spreading element, is, in particular in the unloaded state, smaller than 60 mm, preferably smaller than 50 mm, advantageously smaller than 40 mm.

For example a ratio C/Q of the extension C, which is measured transverse to said optical axis of said radiation field amplifier system, of said one heat spreading element or of at least one heat spreading element of said several heat spreading elements, in particular of said first heat spreading element and/or of said second heat spreading element, to the radius Q of curvature of the contact surface of said heat spreading element is, in particular in the unloaded state, larger than 0.0002, advantageously larger than 0.0005, in particular larger than 0.001.

Advantageously the ratio C/Q of the extension C, which is measured transverse to said optical axis of said radiation field amplifier system, of said one heat spreading element or of at least one heat spreading element of said several heat spreading elements, in particular of said first heat spreading element and/or of said second heat spreading element, to the radius Q of curvature of the contact surface of said heat spreading element is, in particular in the unloaded state, smaller than 0.1, advantageously smaller than 0.02, preferably smaller than 0.01, in particular smaller than 0.008.

Preferably the extensions C, which are measured transverse to said optical axis of said radiation field amplifier system, of at least two heat spreading elements, for example of said first and said second heat spreading elements, preferably of all heat spreading elements, differ with respect to each other, in particular in the unloaded state, by at most 10%, preferably by at most 5%, in particular by at most 2%.

In a preferred embodiment a thickness T of said one heat spreading element or of at least one heat spreading element of said several heat spreading elements, in particular of said first heat spreading element and/or of said second heat spreading element, with the thickness T being measured in axial direction with respect to said optical axis of said radiation field amplifier system, is, in particular in the unloaded state, larger than 0.3 mm, preferably larger than 0.7 mm, in particular larger than 1 mm.

For example the thickness T of said one heat spreading element or of at least one heat spreading element of said several heat spreading elements, in particular of said first heat spreading element and/or of said second heat spreading element, with the thickness T being measured in axial direction with respect to said optical axis of said radiation field amplifier system, is, in particular in the unloaded state, smaller than 5 mm, preferably smaller than 4 mm, in particular smaller than 3 mm.

Advantageously, the thicknesses T of at least two heat spreading elements, for example of said first and said second heat spreading elements, in particular of all heat spreading elements, differ with respect to each other, in particular in the unloaded state, by at most 10%, preferably by at most 5%, in particular by at most 2%.

In a preferred embodiment a ratio Q/T of the radius Q of curvature of the contact surface of said one heat spreading element or of at least one heat spreading element of said several heat spreading elements, in particular of said first contact surface and/or of said second contact surface, to the thickness T, which is measured in axial direction with respect to said optical axis of said radiation field amplifier system, of said heat spreading element is, in particular in the unloaded state, larger than 1.000, advantageously larger than 2.000, in particular larger than 5.000, preferably larger than 8.000.

In a preferred embodiment the ratio Q/T of the radius Q of curvature of the contact surface of said one heat spreading element or of at least one heat spreading element of said several heat spreading elements, in particular of said first contact surface and/or of said second contact surface, to the thickness T, which is measured in axial direction with respect to said optical axis of said radiation field amplifier system, of said heat spreading element is, in particular in the unloaded state, smaller than 40.000, advantageously smaller than 20.000, in particular smaller than 17.000, preferably smaller than 14.000.

Preferably, a ratio C/T of the extension C, which is measured transverse to said optical axis of said radiation field amplifier system, of said one heat spreading element or of at least one heat spreading element of said several heat spreading elements, in particular of said first heat spreading element and/or of said second heat spreading element, to the thickness T, which is measured in axial direction with respect to said optical axis of said radiation field amplifier system, of said heat spreading element is, in particular in the unloaded state, larger than 4, in particular larger than 6, preferably larger than 10.

Preferably, the ratio C/T of the extension C, which is measured transverse to said optical axis of said radiation field amplifier system, of said one heat spreading element or of at least one heat spreading element of said several heat spreading elements, in particular of said first heat spreading element and/or of said second heat spreading element, to the thickness T, which is measured in axial direction with respect to said optical axis of said radiation field amplifier system, of said heat spreading element is, in particular in the unloaded state, smaller than 25, in particular smaller than 22, preferably smaller than 18.

There are various ways to exert the force on said one heat spreading element or on at least one of said several heat spreading elements.

Preferably said mounting system exerts the force on at least one heat spreading element, in particular to all heat spreading elements.

Preferably, said force, which is exerted on said heat spreading element, is exerted by a force exerting unit, with which advantageously a strengths of said force is adjustable, in particular adjustable during operation of said radiation field amplifier system and/or with which an essentially constant force is exertable, in particular during operation of said radiation field amplifier system, where the force is essentially constant in particular when it varies around a constant value by at most 15%, preferably by at most 10%, in particular by at most 5%, for example by at most 2%.

For example, the force exerting unit comprises at least one piezoelectric element.

Advantageously, with said at least one piezo electric element the force is adaptable during operation of said amplifier system and in particular can be adjusted to compensate for thermal expansions of said amplifying unit.

Advantageously, the force exerting unit comprises at least one spring.

An advantageous embodiment provides, that at least one heat spreading element is spring actuated, for example said first heat spreading element and/or said second heat spreading element is/are spring actuated, in particular all heat spreading elements are spring actuated.

Advantageously, all heat spreading elements are actuated by a same at least one spring, such that the strengths of the forces to which said heat spreading elements are exposed to, are essentially the same.

Advantageously, the spring, which actuates said at least one spring actuated heat spreading element, levels off changes in said heat dissipation system and/or said mounting system, such that the force, to which said at least one heat spreading element is exposed, is balanced.

A preferred embodiment provides, that a strength of a force with which said one heat spreading element or at least one of said several heat spreading elements, for example said first heat spreading element and/or said second heat spreading element, is pressed against said amplifying unit is adjustable by said mounting system and in particular is adjustable before and/or during and/or after operation of said radiation field amplifier system.

Preferably, the strength of the force with which said at least one pressed heat spreading element is pressed against said amplifying unit is adjusted to increase, in particular optimize, the efficiency of said radiation field amplifier system.

In particular, factors of influence of the strength of the force on the efficiency of said amplifier system comprise one or more of the following factors:

Increasing the strength of the pressing force may result in an improved interface between said amplifying unit and said at least one heat spreading element leading to an increased heat conductance between these elements, whereas at too large strengths of the pressing force said at least one heat spreading element may detach within the region of penetration from said amplifying unit resulting in a decrease of the heat conductance and an increase of diffraction losses within said radiation field.

Moreover, the strength of the pressing force is furthermore in particular limited to reasonable values of the strength, not to damage elements of said amplifier system, for example said heat spreading elements and/or said amplifying unit and/or elements of said optical devices.

Advantageously, the strength of the force with which said at least one pressed heat spreading element is pressed against said amplifying unit is adjusted to reduce distortions within said radiation field, in particular to reduce distortions within said radiation field which occur in said at least one pressed heat spreading element and/or said amplifying unit and/or in the contact area between said at least one pressed heat spreading element and said amplifying unit.

Thereby an easy way to improve the efficiency of said radiation field amplifier system is provided.

In particular for a certain strength of the force with which at least one pressed heat spreading element is pressed against said amplifying unit, the distortions within said radiation field are minimized and the force with which said at least one pressed heat spreading element is pressed against said amplifying unit is adjusted such that its strength is larger than said certain strength of the force and/or is essentially the same as said certain strength of the force at which said distortions within said radiation field are minimal, with said strengths being essentially the same if they differ with respect to each other by less than 15%, advantageously by less than 10%, preferably by less than 5%, for example by less than 2%.

In a preferred embodiment said radiation field amplifier system comprises an adjustment unit.

In particular said adjustment unit enables an adjustment of said one heat spreading element or of at least one of said several heat spreading elements, for example of said first heat spreading element and/or of said second second heat spreading element, in particular an adjustment of all heat spreading elements.

An advantageous embodiment provides, that said adjustment unit for adjusting said at least one adjustable heat spreading element is there to adjust said one or at least one adjustable heat spreading element such that the central area of said one or at least one adjustable heat spreading element lies within the contact area of said one or at least one adjustable heat spreading element.

Preferably said adjustment unit for adjusting said one or at least one adjustable heat spreading element is there to adjust said one or at least one adjustable heat spreading element into a desired position.

In particular, in said desired position said region of penetration of said radiation field passes through the contact area between said one or at least one adjustable heat spreading element and said amplifying unit, in particular through the central area of said one or at least one adjustable heat spreading element.

Preferably, with said adjustment unit at least two heat spreading elements, in particular said first and said second heat spreading elements, are adjustable into desired positions.

For example, in said desired positions the contact areas of said at least two adjustable heat spreading elements are aligned with respect to each other, in particular such that said region of penetration of said radiation field passes through said two contact areas.

Advantageously, in said desired position/in said desired positions said pumping radiation field passes through the contact areas between said adjustable heat spreading elements and said amplifying unit, in particular through the central areas of said adjustable heat spreading elements.

Advantageously, said adjustment unit enables an adjustment of at least one optical element of at least one of said optical devices.

In particular said adjustment unit enables an adjustment of said first optical element of said first optical device and/or of said second optical element of said second optical device.

Accordingly, said preceding specification of solutions according to the present invention comprises in particular combinations of features according to the following consecutively numbered embodiments:

1. Radiation field amplifier system for a radiation field comprising an amplifying unit and a heat dissipation system with one heat spreading element or several heat spreading elements wherein said one heat spreading element or at least one of said several heat spreading elements of said heat dissipation system is pressed with a contact surface within a contact area against said amplifying unit and said contact surface rises starting from a geometrical reference plane in direction towards said amplifying unit and a distance (d) between said contact surface and said geometrical reference plane attains its largest value within a central area which is arranged inside said contact area and said distance (d) is smaller outside said central area than inside said central area.

2. Radiation field amplifier system according to embodiment 1, wherein said radiation field amplifier system comprises a first optical device and a second optical device and in particular at least one of said optical devices is part of said heat dissipation system.

3. Radiation field amplifier system according to one of the preceding embodiments, wherein said optical devices act birefringently on said radiation field and in particular said birefringence in at least one of said first and said second optical devices is induced by stress and/or thermal gradients within said at least one optical device.

4. Radiation field amplifier system according to one of the preceding embodiments, wherein optical path lengths through at least one of said optical devices are for two components of said radiation field, which are polarized perpendicular to each other, different.

5. Radiation field amplifier system according to one of the preceding embodiments, wherein differences in refractive indices to which components of said radiation field, which are polarized perpendicular to each other, are exposed, in said first optical device and in said second optical device are essentially the same, with said differences being essentially the same, if said differences are the same or deviate from each other by at most 10%, in particular by at most 5%, preferably by at most 1%.

6. Radiation field amplifier system according to one of the preceding embodiments, wherein said amplifier system comprises a source of a pumping radiation field and said pumping radiation field provides pumping energy to said amplifying unit.

7. Radiation field amplifier system according to one of the preceding embodiments, wherein said radiation field is amplified by said amplifying unit.

8. Radiation field amplifier system according to one of the preceding embodiments, wherein said amplifying unit inverts a phase shift between components of said radiation field, which are polarized parallel and perpendicular to an initial polarization direction (P) of said radiation field.

9. Radiation field amplifier system according to one of the preceding embodiments, wherein said amplifying unit is clamped in between a first and a second heat spreading element of said heat dissipation system.

10. Radiation field amplifier system according to one of the preceding embodiments, wherein said at least one heat spreading element, in particular said first and said second heat spreading elements, are in thermal contact with one or more heatsinks, which preferably comprise a cooling system.

11. Radiation field amplifier system according to one of the preceding embodiments, wherein at least one heat spreading element of said heat dissipation system is an element of one of said first and said second optical devices.

12. Radiation field amplifier system according to one of the proceeding embodiments, wherein a region of penetration of said radiation field passes through said contact area, within which said one heat spreading element or one of said several heat spreading elements is pressed against said amplifying unit.

13. Radiation field amplifier system according to one of the preceding embodiments, wherein said first heat spreading element is pressed within a first contact area against said amplifying unit and said second heat spreading element is pressed within a second contact area against said amplifying unit and said region of penetration of said radiation field passes through said first contact area and through said second contact area.

14. Radiation field amplifier system according to one of the preceding embodiments, wherein a first contact area between said first heat spreading element and said amplifying unit and a second contact area between said second heat spreading element and said amplifying unit are arranged on opposite sides of said amplifying unit.

15. Radiation field amplifier system according to one of the preceding embodiments, wherein, in particular in an unloaded state, the distance (d) between the contact surface and the geometrical reference plane of said one heat spreading element or of at least one of said several heat spreading elements, in particular of said first heat spreading element and/or of said second heat spreading element, increases, in particular continuously, from an outer area of said heat spreading element towards the central area of said heat spreading element and said outer area surrounds said central area.

16. Radiation field amplifier system according to one of the preceding embodiments, wherein, in particular in the unloaded state, the distance (d) between the contact surface and the geometrical reference plane of said one heat spreading element or of at least one of said several heat spreading elements, for example said distance (d1) between said first contact surface and said first geometrical reference plane of said first heat spreading element and/or said distance (d2) between said second contact surface and the second geometrical reference plane of said second heat spreading element, increases, in particular continuously, upon decreasing a radial distance to said optical axis of said radiation field amplifier system.

17. Radiation field amplifier system according to one of the preceding embodiments, wherein the optical axis of said radiation field amplifier system runs through the central area of said at least one heat spreading element, in particular through said first contact area between said amplifying unit and said first heat spreading element and through said second contact area between said amplifying unit and said second heat spreading element.

18. Radiation field amplifier system according to one of the preceding embodiments, wherein the distance (d) between the contact surface and the geometrical reference plane of said one heat spreading element or of at least one of said several heat spreading elements in said contact area is smaller in a pressed and/or pumped state than in an unpressed and/or unpumped state.

19. Radiation field amplifier system according to one of the preceding embodiments, wherein said distance (d1) between said first contact surface and said first geometrical reference plane of said first heat spreading element in said first contact area and/or said distance (d2) between said second contact surface and said second geometrical reference plane of said second heat spreading element in said second contact area are/is smaller in a pressed and/or pumped state than in an unpressed and/or unpumped state.

20. Radiation field amplifier system according to one of the preceding embodiments, wherein the geometrical reference plane of said one heat spreading element or of at least one of said several heat spreading elements, for example the first geometrical reference plane and/or said second geometrical reference plane, runs essentially perpendicular to said optical axis of said radiation field amplifier system, where in particular an angle between said geometrical reference plane and said optical axis differs from 90° by at most ±3°, preferably by at most ±1°, in particular by at most ±0.5°, advantageously by at most ±0.1°.

21. Radiation field amplifier system according to one of the preceding embodiments, wherein the contact surface of at least one heat spreading element, in particular said first contact surface and/or said second contact surface is curved, in particular convex curved with a radius (Q) of curvature of said contact surface being, in particular in the unloaded state, lager than 0.5 m and/or smaller than 50 m.

22. Radiation field amplifier system according to one of the preceding embodiments, wherein the radii (Q) of curvature of the contact surfaces of said first and said second contact surfaces differ with respect to each other, in particular in the unloaded state, by at most 10%, in particular by at most 5%, preferably by at most 2%.

23. Radiation field amplifier system according to one of the preceding embodiments, wherein an extension (C), which is measured transverse to said optical axis of said radiation field amplifier system, of at least one heat spreading element, in particular of said first heat spreading element and/or of said second heat spreading element is, in particular in the unloaded state, larger than 5 mm and/or smaller than 60 mm.

24. Radiation field amplifier system according to one of the preceding embodiments, wherein a ratio C/Q of the extension (C), which is measured transverse to said optical axis of said radiation field amplifier system, of at least one of said several heat spreading elements, in particular of said first heat spreading element and/or of said second heat spreading element, to the radius (Q) of curvature of the contact surface of said heat spreading element is, in particular in the unloaded state, larger than 0.0002 and/or is smaller than 0.1.

25. Radiation field amplifier system according to one of the preceding embodiments, wherein the extensions (C) which are measured transverse to said optical axis of said radiation field amplifier system, of said first and said second heat spreading elements differ with respect to each other, in particular in the unloaded state, by at most 10%, preferably by at most 5%, in particular by at most 2%.

26. Radiation field amplifier system according to one of the preceding embodiments, wherein a thickness (T) of at least one heat spreading element, in particular of said first heat spreading element and/or of said second heat spreading element, with the thickness (T) being measured in axial direction with respect to said optical axis of said radiation field amplifier system, is, in particular in the unloaded state, larger than 0.3 mm and/or smaller than 5 mm.

27. Radiation field amplifier system according to one of the preceding embodiments, wherein the thicknesses (T) of said first heat spreading element and of said second heat spreading element differ with respect to each other, in particular in the unloaded state, by at most 10%, preferably by at most 5%, in particular by at most 2%.

28. Radiation field amplifier system according to one of the preceding embodiments, wherein a ratio Q/T of the radius (Q) of curvature of the contact surface of at least one heat spreading element, in particular of said first contact surface and/or of said second contact surface, to the thickness (T), which is measured in axial direction with respect to said optical axis of said radiation field amplifier system, of said heat spreading element is, in particular in the unloaded state, larger than 1.000 and/or smaller than 40.000.

29. Radiation field amplifier system according to one of the preceding embodiments, wherein a ratio C/T of the extension (C), which is measured transverse to said optical axis of said radiation field amplifier system, of at least one heat spreading element, in particular of said first heat spreading element and/or of said second heat spreading element, to the thickness (T), which is measured in axial direction with respect to said optical axis of said radiation field amplifier system, of said heat spreading element is, in particular in the unloaded state, larger than 4 and/or smaller than 22.

30. Radiation field amplifier system according to one of the preceding embodiments, wherein a mounting system exerts a force on at least one heat spreading element, in particular on said first heat spreading element and/or on said second heat spreading element.

31. Radiation field amplifier system according to one of the preceding embodiments, wherein said force, which is exerted on at least one heat spreading element, for example on said first and/or said second heat spreading element, is exerted by a force exerting unit, with which advantageously a strength of said force is adjustable, in particular adjustable during operation of said radiation field amplifier system.

32. Radiation field amplifier system according to one of the preceding embodiments, wherein said force, which is exerted on at least one heat spreading element, for example on said first and/or said second heat spreading element, is held essentially constant, in particular during operation of said radiation field amplifier system, with the force being essentially constant in particular when it varies around a desired value by at most ±15%, preferably by at most ±10%, in particular by at most ±5%, for example by at most ±2%.

33. Radiation field amplifier system according to one of the preceding embodiments, wherein the force exerting unit comprises at least one piezoelectric element.

34. Radiation field amplifier system according to one of the preceding embodiments, wherein the force exerting unit comprises at least one spring.

35. Radiation field amplifier system according to one of the preceding embodiments, wherein at least one heat spreading element, for example said first heat spreading element and/or said second heat spreading element, is spring actuated.

36. Radiation field amplifier system according to one of the preceding embodiments, wherein the strength of the force with which said one heat spreading element or at least one of said several heat spreading elements, in particular said first heat spreading element and/or said second heat spreading element, is pressed against said amplifying unit is adjustable by the mounting system and in particular is adjustable before and/or during and/or after operation of said radiation field amplifier system.

37. Radiation field amplifier system according to one of the preceding embodiments, wherein the strength of the force with which said one heat spreading element or at least one of said several heat spreading elements, in particular said first heat spreading element and/or said second heat spreading element, is pressed against said amplifying unit is adjusted to increase the efficiency of said radiation field amplifier system, in particular to optimize the efficiency of said radiation field amplifier system, that is for example, the strength of said force is adjusted to an optimized value and with respect to strengths of the force, which deviate at most by ±50% from said optimized value, the efficiency of said radiation field amplifier system is maximal for a strength of said force, which differs by at most ±20%, preferably by at most ±15%, advantageously by at most ±10%, in particular by at most ±5%, for example by at most ±1% from said optimized value.

38. Radiation field amplifier system according to one of the proceeding embodiments, wherein said radiation field amplifier system comprises an adjustment unit, which enables an adjustment of said one heat spreading element or at least one of said several heat spreading elements, in particular of said first heat spreading element and/or of said second heat spreading element, to adjust said one or at least one adjustable heat spreading element into a desired position.

39. Radiation field amplifier system according to one of the preceding embodiments, wherein in the desired position said region of penetration of said radiation field passes through the contact area between said one or at least one adjustable heat spreading element and said amplifying unit.

40. Radiation field amplifier system according to one of the preceding embodiments, wherein in said desired positions the contact areas of said at least two adjustable heat spreading elements, for example said first contact area and said second contact area, are aligned with respect to each other, in particular such that said region of penetration of said radiation field passes through said two contact areas.

41. Radiation field amplifier system according to one of the preceding embodiments, wherein in said desired positions said pumping radiation field passes through the contact areas between said adjustable heat spreading elements and said amplifying unit, in particular through the central areas of said adjustable heat spreading elements.

42. Radiation field amplifier system according to one of the preceding embodiments, wherein said adjustment unit enables an adjustment of at least one optical element of at least one of said optical devices, in particular of said first optical element and/or of said second optical element.

Further features and explanations with respect to the present invention are disclosed in connection with the detailed specification and the drawings.

BRIEF DESCRIPTION OF THE DRAWINGS

FIG. 9 shows an embodiment of a heat spreading element and
FIG. 10 shows a resonator.

DETAILED DESCRIPTION OF THE INVENTION

Figure 1:
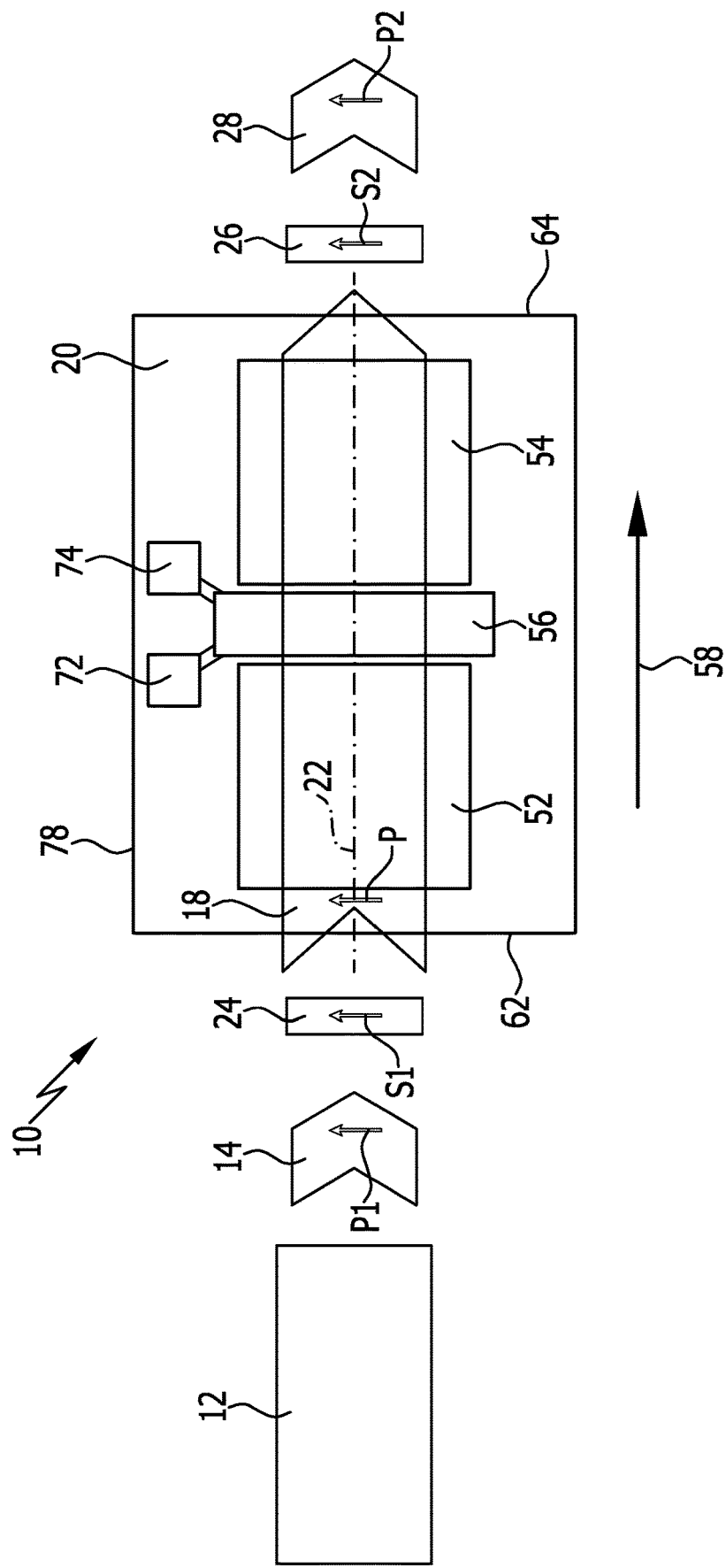
FIG. 1 shows a radiation field generating unit.

A radiation field generating unit 10 comprises a radiation field source 12, which generates an initial radiation field 14 and initial radiation field 14 enters as a penetrating radiation field 18 a radiation field amplifier system 20, as it is sketched exemplarily in FIG. 1.

Penetrating radiation field 18 propagates essentially in an axial direction with respect to an optical axis 22 of radiation field amplifier system 20.

For example, there is a first polarization selecting element 24, for example a polarization filter and first polarization selecting element 24 is arranged in between source 12 and amplifier system 20.

Initial radiation field 14 propagates from source 12 towards first polarization selecting element 24, which converts initial radiation field 14 into radiation field 18, and radiation field 18 propagates towards amplifier system 20 and passes through amplifier system 20.

Preferably, there is a second polarization selecting element 26, for example a polarization filter, which in relation to the axial direction of optical axis 22 follows amplifier system 20.

Accordingly, penetrating radiation field 18 propagates from amplifier system 20 towards second polarization selecting element 26 and second polarization selecting element 26 converts penetrating radiation field 18 into a provided radiation field 28.

Initial radiation field 14 and thus penetrating radiation field 18 and provided radiation field 28 have a wave length L and in particular radiation fields 14, 18 and 28 are laser beams.

Initial radiation field 14 is in particular essentially linearly polarized with a polarization direction P1.

Polarization selecting element 24 removes components of initial radiation field 14, which are polarized transverse to a selecting polarization direction S1, and provides radiation field 18 linearly polarized with a polarization direction parallel to direction S1.

For example polarization selecting element 24 is provided to remove depolarizations in initial radiation field 14 and to do so polarization direction P1 and selecting polarization direction S1 of polarization selecting element 24 are parallel to each other.

In a variation of the present embodiment, polarization direction P1 and selecting polarization direction S1 are at an angle to each other and in consequence only that component of initial radiation field 14, which is polarized in direction of selecting polarization direction S1, passes through first polarization selecting element 24 and converts to radiation field 18.

Accordingly, an intensity of radiation field 18 is reduced with respect to an intensity of initial radiation field 14 with the amount of reduction depending on the angle between the directions P1 and S1, where the intensity of radiation field 18 is vanishingly small for the angle being 90° and the intensity of radiation field 18 being essentially the intensity of initial radiation field 14 for the angle being essentially zero.

The intensity of radiation field 18 is continuously adjustable between these two extreme values by adjusting the angle between the polarization direction P1 of radiation field 14 and selecting polarization direction S1 of polarization selecting element 24 accordingly.

Therefore, radiation field 18 is essentially linearly polarized in a polarization direction P with polarization direction P being parallel to selecting polarization direction S1 for embodiments comprising first polarization selecting element 24 and with polarization direction P being parallel to polarization direction P1 of initial radiation field 14 for embodiments without first polarization selecting element 24.

Second polarization selecting element 26 removes components of radiation field 18, which are polarized transverse to d selecting polarization direction S2, and in consequence provided radiation field 28 is essentially linearly polarized in a polarization direction P2 with direction P2 being parallel to direction S2.

In particular selecting polarization direction S2 is parallel to polarization direction P of radiation field 18, for example to polarization direction P of radiation field 18 when entering amplifier system 20 or to the direction of polarization of a component contributing most to radiation field 18 when exiting amplifier system 20, such that polarization selecting element 26 removes undesirable components of radiation field 18, such as disturbances of the polarization of radiation field 18, and provides radiation field 28 essentially linearly polarized.

Radiation field amplifier system 20 comprises a first optical device 52, a second optical device 54 and an amplifying unit 56.

Penetrating radiation field 18 penetrates amplifier system 20 in a direction 58 of penetration, such that penetrating radiation field 18 enters amplifier system 20 on a first side 62, penetrates first optical device 52, then amplifying unit 56 and finally second optical device 54 and exits amplifier system 20 on a second side 64.

Accordingly, in relation to the propagation of penetrating radiation field 18 amplifying unit 56 is arranged between first optical device 52 and second optical device 54.

In a variation of the embodiment, radiation field 18 comprises several branches with each branch of radiation field 18 extending from one of first or second optical device 52, 54 to the other optical device 54, 52 and by propagating from one optical device 52, 54 to the other optical device 54, 52 each branch of radiation field 18 passes through amplifying unit 56.

Direction 58 of penetration is defined locally by a propagation of radiation field 18 in a corresponding area and the direction 58 of penetration of radiation field 18 may be changed by reflecting or refracting elements of optical devices 52 and 54 or of amplifying unit 56.

Further radiation field amplifier system 20 comprises a pumping device 72, which provides pumping energy which is needed to amplify radiation field 18, and a heat dissipation system 74, which enables dissipation of heat in amplifier system 20 and which in particular guides a flow of heat away from amplifying unit 56 and prevents overheating of amplifying unit 56.

A mounting system 78 holds the elements of amplifier system 20 together.

Figure 2:
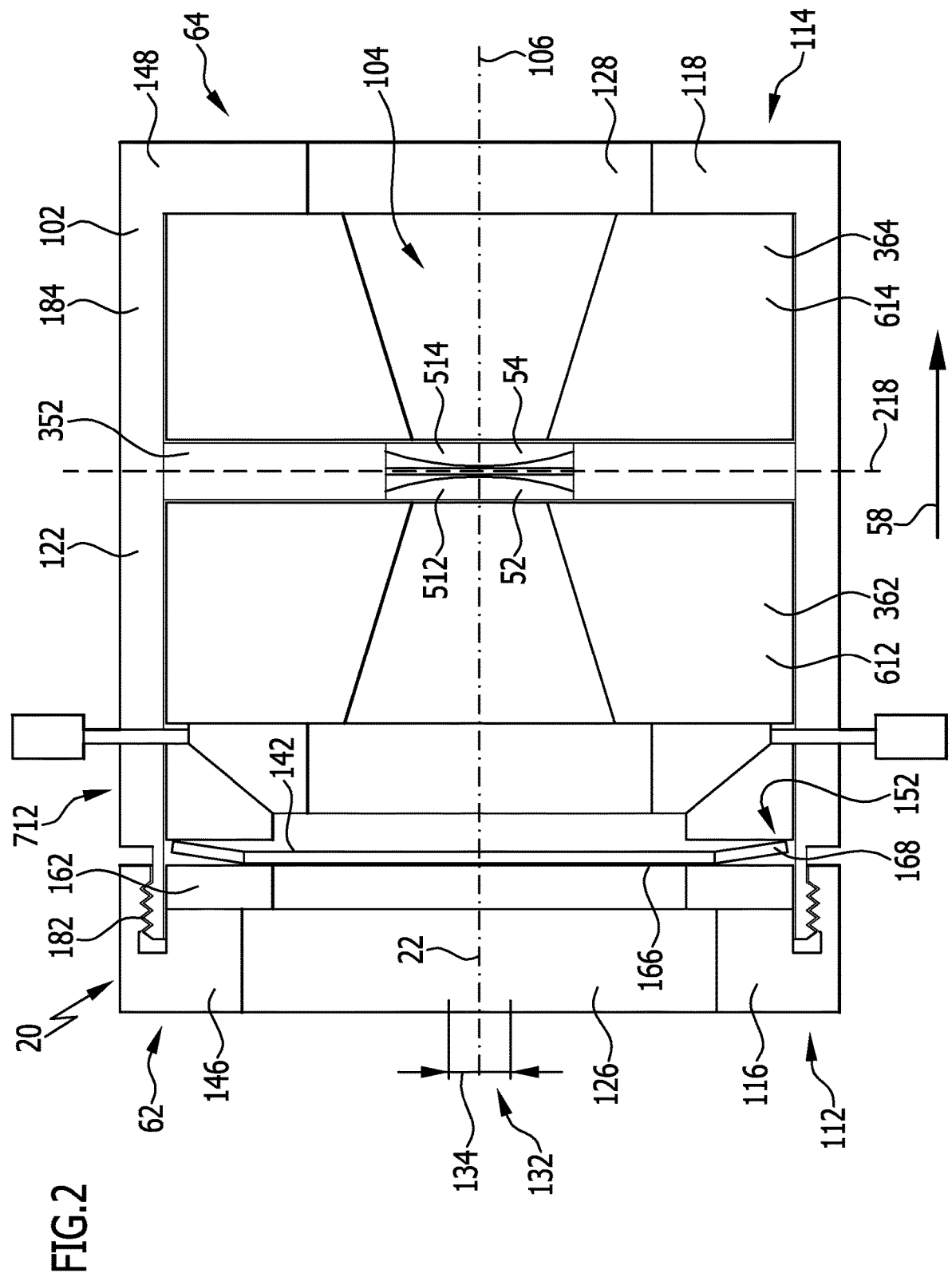
FIG. 2 shows a radiation field amplifier system.

Mounting system 78 comprises a housing 102 with an interior 104, which contains amplifying unit 56 and, at least partially, optical devices 52 and 54 and heat dissipation system 74 (FIG. 2).

Housing 102 extends in axial direction of a housing axis 106 from a first side 112 to a second side 114 and in particular housing 102 is essentially rotationally symmetrical with respect to housing axis 106.

At first side 112 there is a first bounding element 116 and at second side 114 there is a second bounding element 118 with interior 104 being in between first and second bounding elements 116 and 118.

A housing wall 122 extends from first bounding element 116 to second bounding element 118 with interior 104 being enclosed by housing wall 122 in radial direction to housing axis 106.

For example first bounding element 116 is designed as a lid element which is detachable attached to housing wall 122, for example with a screw connection.

At first side 112 there is an inlet 126, for example an opening in first bounding element 116, for radiation field 18 and at second side 114 there is an outlet 128, for example an opening in second bounding element 118, for radiation field 18.

Radiation field 18 penetrates amplifier system 20 within a region 132 of penetration, where radiation field 18 enters housing 102 at inlet 126 and exits housing 102 at outlet 128, such that region 132 of penetration extends within housing 102 between inlet 126 and outlet 128.

Region 132 of penetration extends along direction 58 of penetration from inlet 126 to outlet 128 and is elongated in direction 58 of penetration and exhibits an extension transverse to direction 58 of penetration with a maximal extension 134.

Region 132 of penetration is tube-like shaped with respect to optical axis 22, that is region 132 of penetration extends in axial direction of optical axis 22 and maximal extension 134 is measured in radial direction of optical axis 22.

In embodiment according to FIG. 2 region 132 of penetration is in housing 102 aligned along housing axis 106 and maximal extension 134 is measured in radial direction to housing axis 106.

Further, mounting system 78 comprises a spring 142, which is fixed, for example indirectly, between a first stop element 146 and a second stop element 148 and with that mounting system 78 provides a connection 152 actuated by force with spring 142 tightening elements of mounting system 78 and enabling an adjustment of an exerted force.

In particular there is a force transmitting element 162 between spring 142 and first stop element 146, such that stop element 146 supports spring 142 indirectly.

In a variation of the embodiment spring 142 is aligned directly at first stop element 146, such that first stop element 146 supports spring 172 directly.

First stop element 146 is for example fixed at housing 102, in particular first bounding element 116 provides first stop element 146.

Second stop element 148 supports spring 142 indirectly via connection 152 actuated by force with amplifying unit 56 and elements of optical devices 52 and 54 providing connection 152, such that amplifying unit 56 and elements of optical devices 52 and 54 are clamped between stop element 148 and spring 142.

For example stop element 148 is fixed with housing 102, in particular bounding element 118 provides stop element 148.

Spring 142, for example designed as a disc spring, comprises a base element 166 and a limb element 168 with base element 166 providing an opening through which region 132 of penetration extends and in consequence radiation field 18 is free of interaction with spring 142.

Base element 166 extends for example disc like essentially in a geometrical plane.

Limb element 168 extends from a first end 172 to a second end 174 with first end 172 being mounted at base element 166.

A position of second end 174 relative to first end 172 is changeable with second end 174 possessing a relax position and several tension positions.

With second end 174 being in its relax position, spring 142 is essentially tension free, where second end 174 in its relaxed position being for example at a distance to the plane of base element 166.

For second end 174 being in one of its tension positions, spring 142 is subjected to stress and exerts a force to adjacent elements and thereby provides force to connection 152.

In particular, the distance of second end 174 to the plane of base element 166 is in the tension positions altered relative to the distance of second end 174 to the plane of base element 166 in its relaxed position, for example the distance in the tension position is reduced relative to the distance in the relax position.

Mounting system 78 possesses a fix state and an adjustment state with elements of mounting system 78 being fixed in the fix state and the adjustment state is for adjusting the force transmitted by connection 152, in particular the positions of elements of mounting system 78 are adjustable in the adjustment state.

In the fix state, stop elements 146 and 148 are fixed relative to each other, such that a relative position of these elements is essentially constant, and spring 142 and other elements of mounting system 78 are clamped between the stop elements 146 and 148, whereas in the adjustment state a relative position between the stop elements 146 and 148 is adjustable, such that the tension state of spring 142 is changeable as well as its exerted force and accordingly in the adjustment state the strength of the force transmitted by connection 152 is adjustable.

In embodiment according to FIG. 2 stop elements 146 and 148 are connected by a screwed joint 182 of a connection device 184 with screwed joint 182 being fixed in the fix state and offers the ability to adjust the relative distance between the stop elements 146 and 148 and in consequence the force transmitted by connection 152 within the adjustment state.

In particular, connection device 184 comprises housing wall 122.

Figure 4:
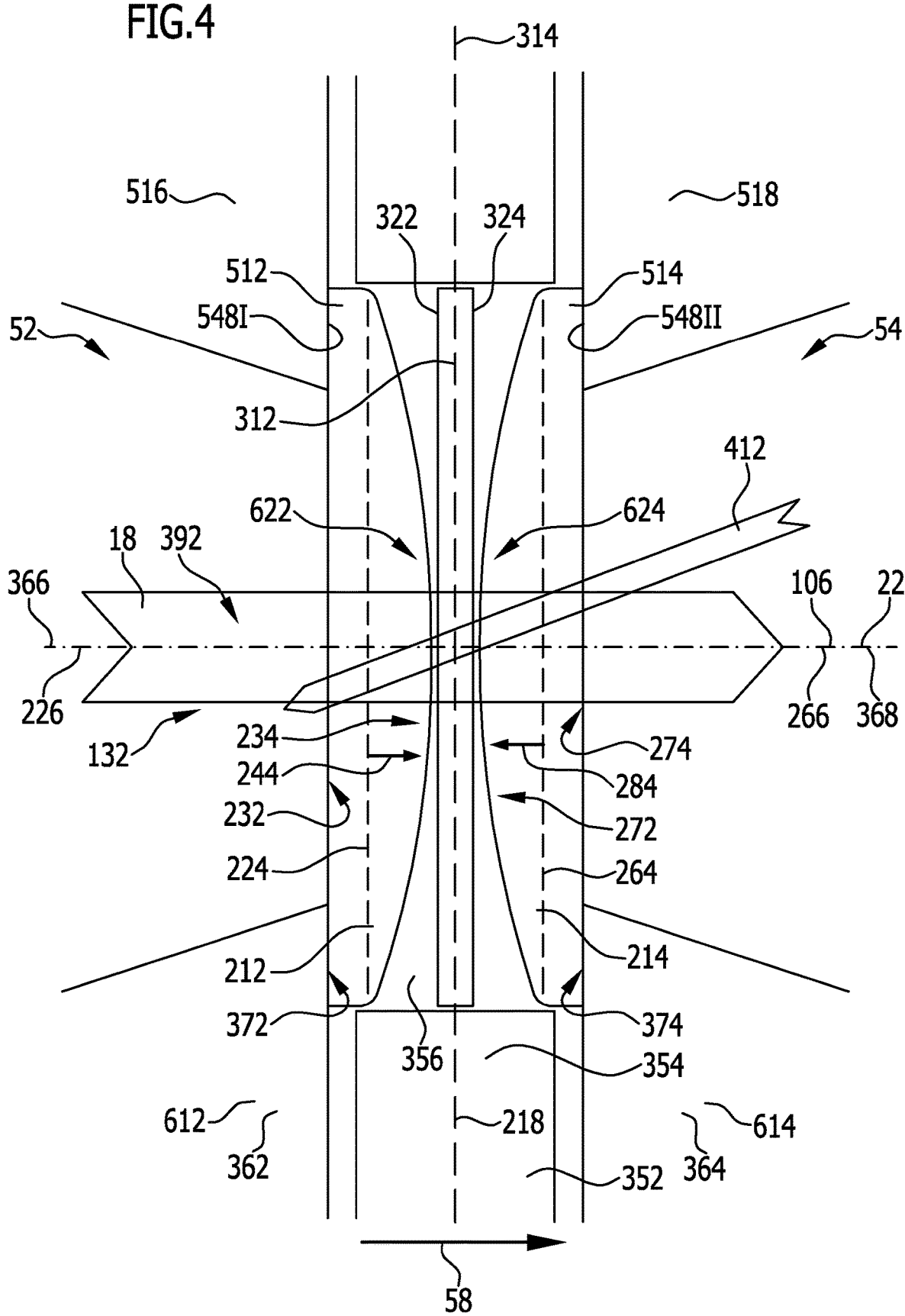
FIG. 4 shows an enlarged view of a part of the radiation field amplifier system with an amplifying unit, a first and a second optical device and a first and a second heat spreading element.

Optical device 52 comprises an optical element 212 and optical device 54 comprises an optical element 214, which are shown enlarged in FIG. 4.

Optical elements 212 and 214 are, at least partially, mounted in region 132 of penetration and in particular optical elements 212 and 214 are aligned symmetrical to each other with respect to a plane 218 of symmetry with symmetry plane 218 being angled, in particular perpendicular, to optical axis 22 and for example symmetry plane 118 extends in radial direction to housing axis 106.

Optical elements 212 and 214 comprise a material transparent for radiation field 18 and in particular this material is in a stress-free and thermal gradient free state optical isotropic.

Figure 5:
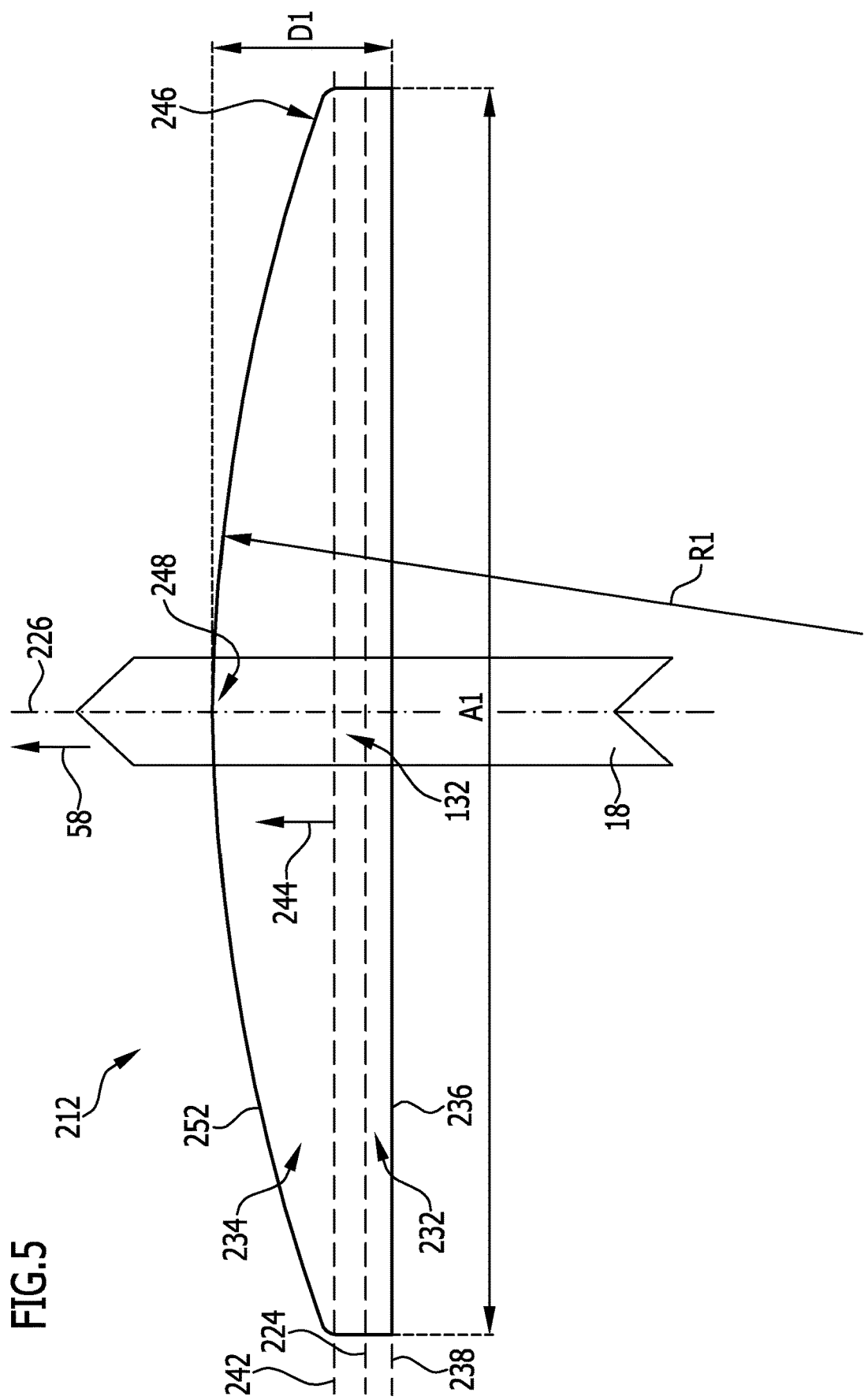
FIG. 5 shows the first optical element.

Optical element 212, exemplarily shown in FIG. 5, is disc-like formed, that is, optical element 212 extends mainly in a geometrical disc plane 224, which is aligned transverse, in particular perpendicular, to a main axis 226.

An extension A1 of optical element 212 within geometrical disc plane 224 is larger, in particular at least about a factor 4 larger, than a thickness D1 of optical element 212 across geometrical disc plane 224, where thickness D1 is measured in particular perpendicular to disc plane 224 and in axial direction of main axis 226.

In particular main axis 226 coincides with optical axis 22 or both axes 22 and 226 are essentially parallel, that is an angle between these axes 22 and 226 is smaller than 10°, in particular smaller than 3°, preferably smaller than 1°.

For example, geometrical disc plane 224 is essentially parallel to symmetry plane 218, that is an angle between planes 224 and 218 is smaller than 10°, in particular smaller than 3°, preferably smaller than 1°.

Preferably, optical element 212 is rotationally symmetrical to main axis 226.

Radiation field 18 penetrates optical element 212 in direction 58 of penetration from a first part 232 to a second side 234, in particular across geometrical disc plane 224.

Parts 232 and 234 are arranged on opposite sides of optical element 212 and geometrical disc plane 224 is aligned in between parts 232 and 234.

Preferably, optical element 212 has at parts 232 and 234 anti-reflection-layers, which suppress reflection of radiation field 18, when it enters or exits optical element 212.

First part 232 is planar, that is an outer surface 236 of optical element 212 at first part 232 is aligned essentially in a geometrical plain plane 238 with geometrical plain plane 238 being essentially perpendicular to direction 58 of penetration, such that an angle between outer surface 236 and direction 58 of penetration, in particular in region 132 of penetration, is about 90° with a deviation of at most ±10°, preferably of at most ±3°, advantageously of at most ±1° and for example geometrical plain plane 238 is essentially parallel to disc plane 224, that is an angle between planes 238 and 224 is smaller than 10°, in particular smaller than 3°, preferably smaller than 1°.

Second side 234 rises from a geometrical basis plane 242 in a direction 244 of rising with geometrical basis plane 242 being essentially parallel to geometrical plain plane 238, and accordingly to geometrical disc plane 224, such that an angle between planes 242 and 238 is in particular smaller than 10°, in particular smaller than 3°, preferably smaller than 1° and preferably direction 244 of rising is directed towards direction 58 of penetration and thus essentially parallel to the axial direction of main axis 226, with an angle between these directions being for example smaller than 10°, in particular smaller than 3°, preferably smaller than 1°.

Second side 234 rises, in particular continuously increasing, from an outer area 246 towards a central area 248 with second side 234 being thinnest in outer are 246 and being thickest in central area 248.

In particular outer area 246 surrounds central area 248 with outer area 246 being at a distance to central area 248, such that for example an intermediate area is located between outer area 246 and central area 248.

In one embodiment, main axis 226 passes through central area 248 and outer area 246 encloses main axis 226 at a radial distance.

Accordingly, an outer surface 252 of optical element 212 at second side 234 ascends from geometrical basis plane 242 at outer area 246 towards central area 248 and thereby a distance of surface 252 to geometrical plain plane 238, in particular to outer surface 236, at second side 234 enlarges.

For example outer surface 252 is convex shaped with a radius R1 of curvature being considerably larger, for example at least 2,000 times larger than thickness D1 of optical element 212.

Accordingly, there is a variation of thickness D1 of optical element 212, with the thickness D1 corresponds essentially to the distance between the outer surfaces 236 and 252, along the extensions of outer surfaces 236 and 252, but this variation is rather small, in particular due to the large radius R1 of curvature, such that the variation of thickness D1 is smaller than 1%, preferably smaller than 0.1% of a mean value of thickness D1.

Figure 6:
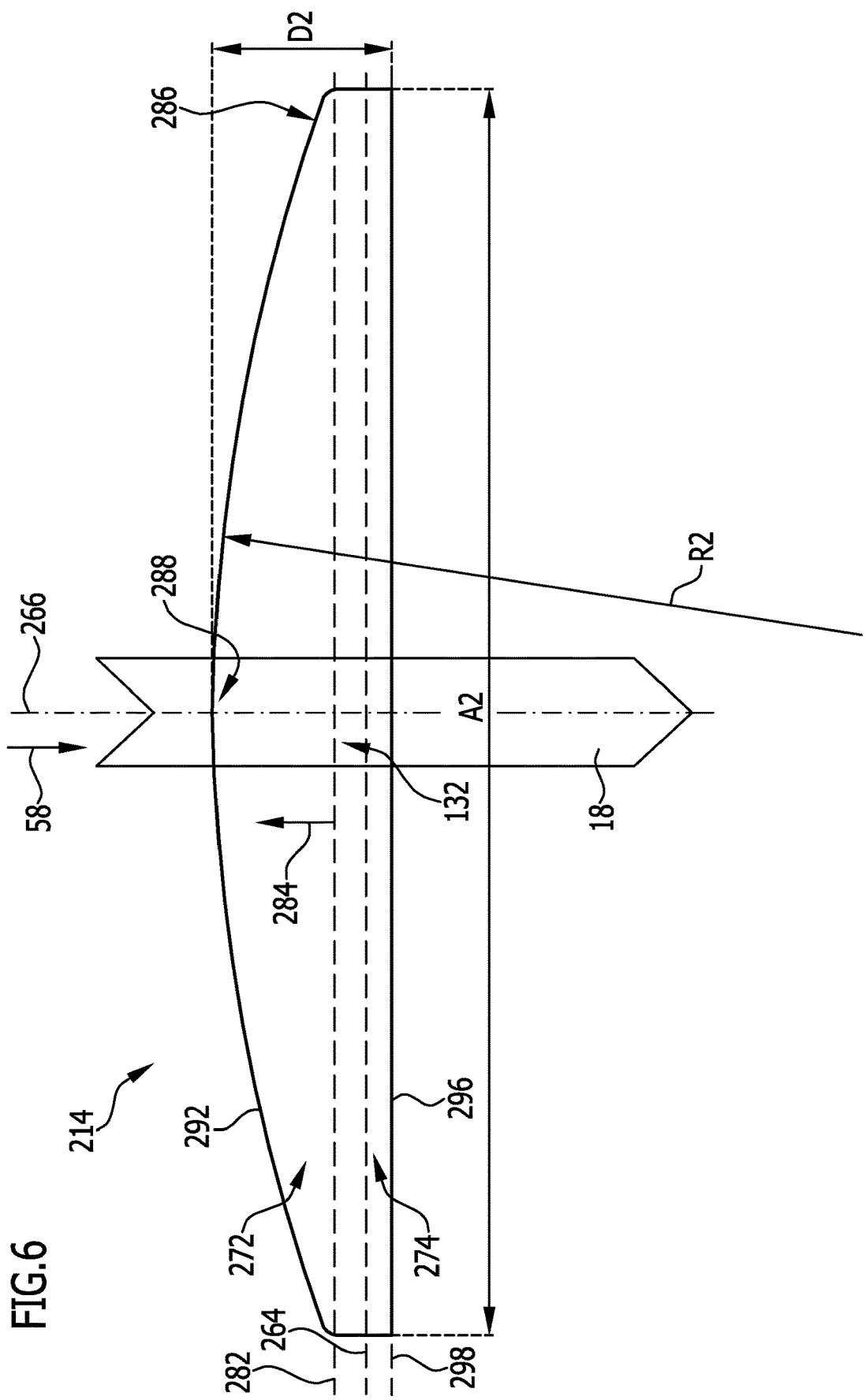
FIG. 6 shows the second optical element.
Figure 7:
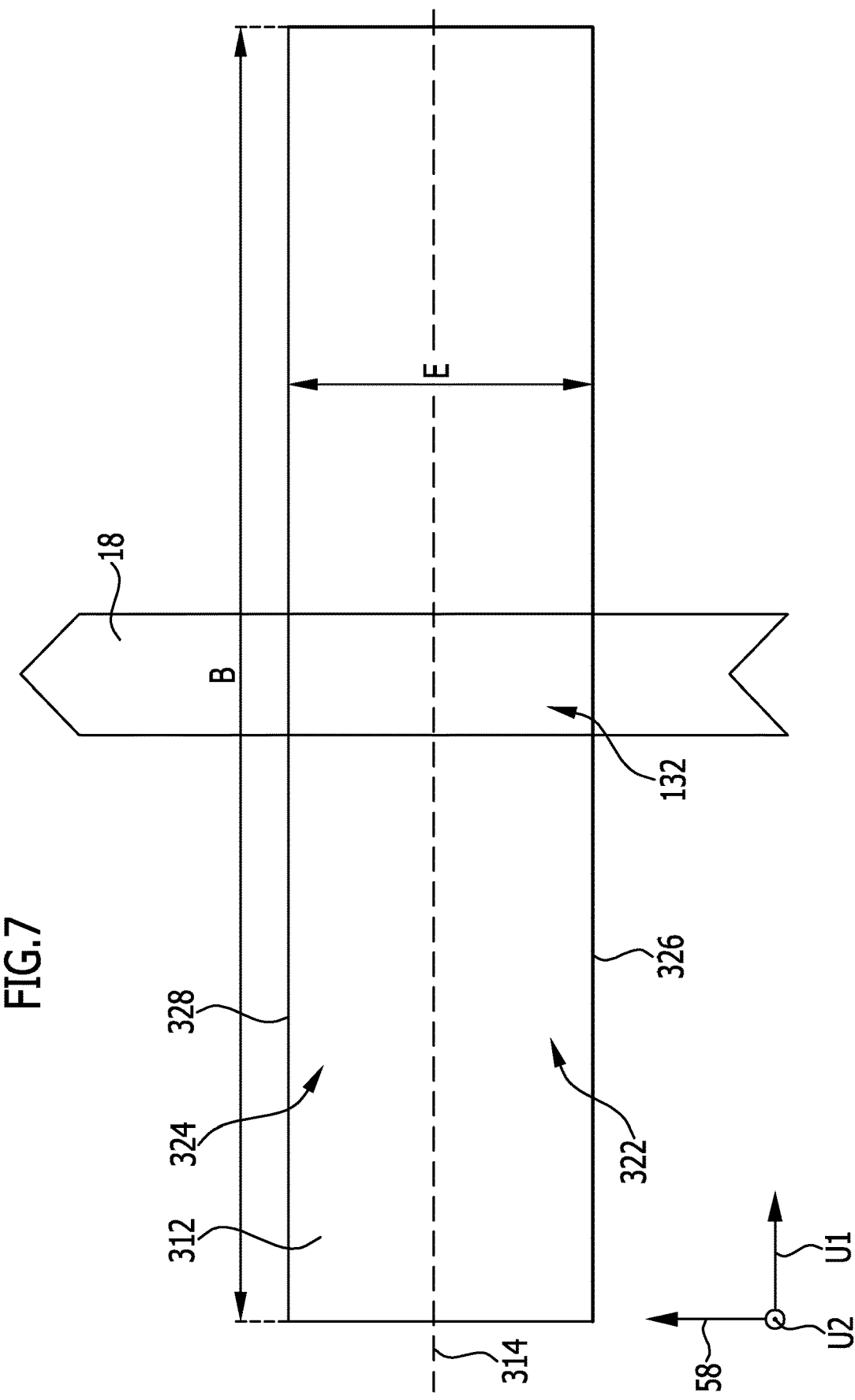
FIG. 7 shows a solid body of the amplifying unit.

Optical element 214, exemplarily shown in FIG. 6, is disc-like formed, that is optical element 214 extends mainly in a geometrical disc plane 264, which extends essentially perpendicular to a main axis 266.

An extension A2 of optical element 214 within geometrical disc plane 264 is considerably larger, for example at least a factor 4 larger, than a thickness D2 of optical element 214 across geometrical disc plane 264, where thickness D2 is measured in particular perpendicular to geometrical disc plane 264 and in axial direction of main axis 226.

Accordingly, an extension of optical element 214 in axial direction of main axis 266 is significantly smaller than an extension of optical element 214 in radial direction of main axis 266.

In particular optical element 214 is rotational symmetric to main axis 266, such that the extension A2 within geometrical disc plane 264 corresponds to a diameter of optical element 214.

In particular, main axis 266 coincides with optical axis 22 or both axes 22 and 226 are essentially parallel, that is an angle between these axes 22 and 226 is smaller than 10°, in particular smaller than 3°, preferably smaller than 1°.

In particular, geometrical disc plane 264 is essentially parallel to symmetry plane 218 and to geometrical disc plane 224 that is an angle between two of these planes is smaller than 10°, in particular smaller than 3°, preferably smaller than 1°.

Radiation field 18 penetrates optical element 214 in direction 58 of penetration from a first part 272 to a second part 274 in particular across geometrical disc plane 264 with direction 58 of penetration being essentially parallel to the axial direction of main axis 266, such that for example an angle between these directions is smaller than 10°, in particular smaller than 3°, preferably smaller than 1°.

Parts 272 and 274 are arranged on opposite sides of optical element 214 and geometrical disc plane 264 is aligned between these parts 272 and 274.

Preferably, optical element 214 has at first part 272 and at second part 274 anti-reflection-layers, which suppress reflection of radiation field 18 when it enters or exits optical element 214.

First part 272 of optical element 214 rises from a geometrical basis plane 282 in a direction 284 of rising, which points away from second part 274.

Geometrical basis plane 282 is for example essentially parallel to geometrical disc plane 264, such that an angle between planes 282 and 264 is smaller than 10°, in particular smaller than 3°, preferably smaller than 1°.

Direction 284 of rising is for example essentially parallel to the axial direction of main axis 266 and the axial direction of optical axis 22, such that an angle between these directions is in particular smaller than 10°, in particular smaller than 3°, preferably smaller than 1°.

First part 272 rises, in particular continuously increasing, from an outer area 286, where second part 274 is thinnest, towards a central area 288, where second part 274 is thickest, with a thickness of second part 274 being in particular measured from geometrical basis plane 282 in direction 284 of rising.

Outer area 286 surrounds for example central area 288 and is being at a distance to central area 288, such that for example an intermediate area is located between outer area 286 and central area 288 and in one embodiment main axis 266 passes through central area 288 and outer area 286 encloses main axis 266 at a radial distance to main axis 266.

Thus an outer surface 292 of optical element 214 at first part 272 ascends from geometrical base plane 282.

Outer surface 292 is located in outer area 286 essentially in geometrical basis plane 282 and in central area 288 outer surface 292 is at a distance to geometrical basis plane 282.

In particular outer surface 292 ascends from geometrical basis plane 282 continuously and preferably outer surface 292 is convex-shaped with a radius R2 of curvature being significantly larger than thickness D2 of optical element 214 and extension A2 of optical element 214, for example radius R2 is at least 2.000 times larger than thickness D2.

Second part 274 of optical element 214 is essentially planar, that is an outer surface 296 of optical element 214 at second part 274 extends essentially in a geometrical plain plane 298.

Geometrical plain plane 298 is essentially perpendicular to direction 58 of penetration, that is direction 58 of penetration is for example angled to geometrical plain plane 298 with an angle larger than 80° and smaller than 100° and in particular geometrical plain plane 298 is essentially parallel to geometrical disc plane 264, that is an angle between these planes 264 and 298 is for example smaller than 10°, in particular smaller than 3°, preferably smaller than 1°.

Thus, thickness D2 of optical element 214, which essentially corresponds to a distance between outer surface 292 and outer surface 296 at first and second parts 272 and 274, varies along an extension of outer surfaces 292 and 296 due to the rising of outer surface 292, but the variation of thickness D2 is rather small, in particular because radius R2 of curvature is significantly larger than thickness D2, such that a variation of thickness D2 is smaller than 1%, for example smaller than 0.1% with respect to a mean value of thickness D2.

Advantageously, the mean value of thickness D2 is essentially the same as the mean value of thickness D1, with these values are essentially the same, if they differ with respect to each other by at most 5% preferably by at most 1%.

Amplifying unit 56 comprises a solid body 312 which contains a laser active material.

Solid body 312 is disc-like shaped within a geometrical disc plane 314, such that an extension B of solid body 312 within geometrical disc plane 314 is larger, for example at least four times larger, than an extension E of solid body 312 across geometrical disc plane 314.

For example, geometrical disc plane 314 corresponds to symmetry plane 218.

Radiation field 18 penetrates solid body 312 in direction 58 of penetration from a first side 322 to a second side 324, where direction 58 of penetration is in particular essentially perpendicular to geometrical disc plane 314, such that an angle between direction 58 of penetration and geometrical disc plane 314 is for example larger than 80° and smaller than 100°.

Sides 322 and 324 are opposing sides and geometrical disc plane 314 is aligned between sides 322 and 324.

Preferably solid body 312 has at first side 322 and at second side 324 anti-reflection layers, which suppress reflection of radiation field 18 when it enters or exits solid body 312.

Sides 322 and 324 are planar, such that a surface 326 of solid body 312 at first side 322 extends essentially in a geometrical plane and a surface 328 of solid body 312 at second side 324 essentially extends in another geometrical plane, with this geometrical planes being essentially parallel to each other and in particular parallel to geometrical disc plane 314, for example angles between two of these planes are smaller than 10°, in particular smaller than 3°, preferably smaller than 1°.

Surfaces 326 and 328 are, in particular in region 132 of penetration, at a distance to each other which corresponds to thickness E of solid body 312 and in particular surfaces 326 and 328 are equidistant to geometrical disc plane 314.

Further, solid body 312 comprises a birefringent medium and a refractive index n of solid body 312 depends on a polarization of a radiation field which penetrates solid body 312.

For components of the radiation field which penetrates solid body 312 and which are polarized in a polarization direction U1, solid body 312 exposes a refractive index n1 and for components which are polarized in a direction U2 solid body 312 exposes a refractive index n2.

For example refractive index n2 is smaller than refractive index n1.

Directions U1 and U2 are perpendicular to each other and preferably perpendicular to optical axis 22 and in particular parallel to geometrical disc plane 314.

Solid body 312 is aligned such that directions U1 and U2 are perpendicular to direction 58 of penetration and in particular one of directions U1 and U2 are aligned essentially parallel to initial polarization direction P of radiation field 18, for example U1 being essentially parallel to initial polarization direction P, with an angle between these directions being for example smaller than 10°, in particular smaller than 3°, preferably smaller than 1°.

In a variant of that embodiment direction U2 is essentially parallel to initial polarization direction P, such that for example an angle between these directions is smaller than 10°, in particular smaller than 3°, preferably smaller than 1°.

Solid body 312 is designed as a half wave plate for radiation fields with wave length L, such that optical path lengths for components of the radiation field with wave length L, which are polarized in direction U1 and U2, respectively, differ by an odd multiple of half of the wave length L, that is the equation $(n1-n2)E=(2m+1)\times L/2$ is essentially satisfied, with m being an integer, for example m=0, and in a variant of the embodiment m=1, and this equation is essentially satisfied, if the thickness E of solid body 312 corresponds to the value given by that equation or differs from this value by at most $\pm L/(6\ n1-6\ n2)$.

With respect to direction 58 of penetration solid body 312 is aligned in between optical elements 212 and 214.

Optical elements 212 and 214 are aligned symmetrically with respect to symmetry plane 218, and in particular the main axes 266 and 226 of optical elements 212 and 214 essentially coincide.

In the embodiment according to FIG. 4, second side 234 of optical element 212, in particular with its central area 248, lies against first side 322 of solid body 312 and first part 272 of optical element 214, in particular with its central area 288, lies against second side 324 of solid body 312.

For example geometrical disc planes 224, 264 and 314 are aligned essentially parallel to each other, such that each angle between two of these planes is in particular smaller than 10°, in particular smaller than 3°, preferably smaller than 1°.

Mounting system 78 holds optical elements 212 and 214 and amplifying unit 56, in particular solid body 312, in their positions.

For alignment of optical elements 212 and 214 and solid body 312 transverse to direction 58 of penetration, in particular in radial direction of main axes 226 and 266, mounting system 78 comprises an alignment ring 352, a wall 354 of which encloses an opening 356.

For example wall 354 runs around an axis 358 of alignment, the axial direction of which corresponds to direction 58 of penetration, and axis 358 of alignment passes through opening 356.

In particular wall 354 and opening 356 are rotational symmetric to axis 358 of alignment and axis 358 of alignment runs parallel to main axes 226 and 266 of optical elements 212 and 214.

Region 132 of penetration passes through opening 356 of alignment ring 352, such that penetrating radiation field 18 is free of interaction with alignment ring 352.

In opening 356 solid body 312 and optical elements 212 and 214 are mounted with wall 354 holding these elements in radial direction to alignment axis 358, in particular in region 132 of penetration.

Optical elements 212 and 214 as well as solid body 312 are part of connection 152 actuated by force of mounting system 78 and are such clamped by mounting system 78.

Mounting system 78 comprises a first load element 362 and a second load element 364, which are preferably shaped analogously, and with first load element 362 acting on optical element 212 and second load element 364 acting on optical element 214.

Load element 362 is rotationally symmetrical to a loading axis 366, which for example essentially coincides with main axis 226 of optical element 212 and load element 364 is rotationally symmetrical to a loading axis 368, which for example essentially coincides with main axis 266 of optical element 214, and in particular loading axes 366 and 368 essentially coincide.

Load element 362 presses, in particular in axial direction of main axis 226 on optical element 212 within an impact area 372, which is at a distance to region 132 of penetration.

Impact area 372 is at first part 232 of optical element 212 and at a distance to region 132 of penetration.

Impact area 372 is symmetrical to main axis 226 of optical element 212, for example runs in a radial distance around main axis 226.

Load element 364 presses, in particular in axial direction of main axis 266, on optical element 214 within an impact area 374, which is at a distance to region 132 of penetration.

Impact area 374 is at second part 274 of optical element 214. Impact area 374 is rotationally symmetric to main axis 266 of optical element 214, for example impact area 374 runs in a radial distance around main axis 266.

Preferably impact areas 372 and 374 are shaped analogously with their positions being shifted with respect to direction 58 of penetration.

Accordingly load elements 362 and 364 clamp optical elements 212 and 214 and solid body 312 together.

Due to the corresponding design of optical element 212, load element 362 and in particular impact area 372 on one hand and optical element 214, load element 364 and in particular impact area 374 on the other hand, for example due to the with respect to symmetry plane 218 symmetrical design, optical elements 212 and 214 are exposed to comparable, in particular essentially the same, stress.

A strength of a force with which load element 362 acts on optical element 212 and a strength of a force with which load element 364 acts on optical element 214 are adjustable by mounting system 78 according to the preceding description and in particular the strength of these forces are the same due to connection 152.

The action of mounting system 78, in particular the impact of load elements 362 and 364, induces strain in optical element 212 and strain in optical element 214 and as a result optical elements 212 and 214 become birefringent.

Accordingly, optical element 212 exposes a refractive index m1, which is due to the induced stress depending on a polarization of a radiation field, which penetrates optical element 212.

Refractive index m1 adopts a value m1r for a radiation field with a polarization direction r1 and a value m1a for a radiation field with a polarization direction a1 where directions r1 and a1 are essentially perpendicular to each other and to optical axis 22 and in particular run within disc plane 224.

In particular due to the rotational symmetric design of optical element 212 and the rotational symmetrical action of mounting system 78 on optical element 212, the stress induced birefringent action of optical element 212 is rotational symmetric to main axis 226, too, that is direction r1 corresponds to the radial direction of main axis 226 and direction a1 runs perpendicular to direction r1, that is in azimuthal direction.

Second optical element 214 exposes a refractive index m2, which is due to the induced stress depending on a polarization of a radiation field, which penetrates optical element 214, with refractive index m2 adopting a value m2r for a radiation field with a polarization direction r2 and a value m2a for a radiation field with a polarization direction a2, where directions r2 and a2 run perpendicular to each other and both directions run perpendicular to direction 58 of penetration, in particular directions r2 and a2 run within geometrical disc plane 264.

In particular, due to the rotational symmetrical design of optical element 214 and the rotational symmetrical action of mounting system 78 on optical element 214, the birefringent action of optical element 214 is rotational symmetrical to main axis 266, too, so that direction r2 runs in radial direction to main axis 266 and direction a2 runs perpendicular to direction r2, that is in azimuthal direction.

Furthermore, due to the corresponding, in particular with respect to symmetry plane 218 symmetrical, arrangement of optical devices 52 and 54, the values of m1r and m2r are essentially the same, for example differ with respect to each other by less than 10%, and the values of m1a and m2a are essentially the same, for example differ by less than 10%, preferably and directions r1 and r2 point in essentially the same direction, for example in radial direction with respect to optical axis 22, and directions a1 and a2 point in essentially the same direction, for example azimuthal around optical axis 22 with two directions pointing in essentially the same direction when an angle between these directions is for example smaller than 10°, in particular smaller than 3°, preferably smaller than 1°.

When penetrating optical device 52 radiation field 18, in particular a cross sectional area 392 of radiation field 18, is exposed to polarization depending refractive index n1 of optical element 212.

Figure 8:
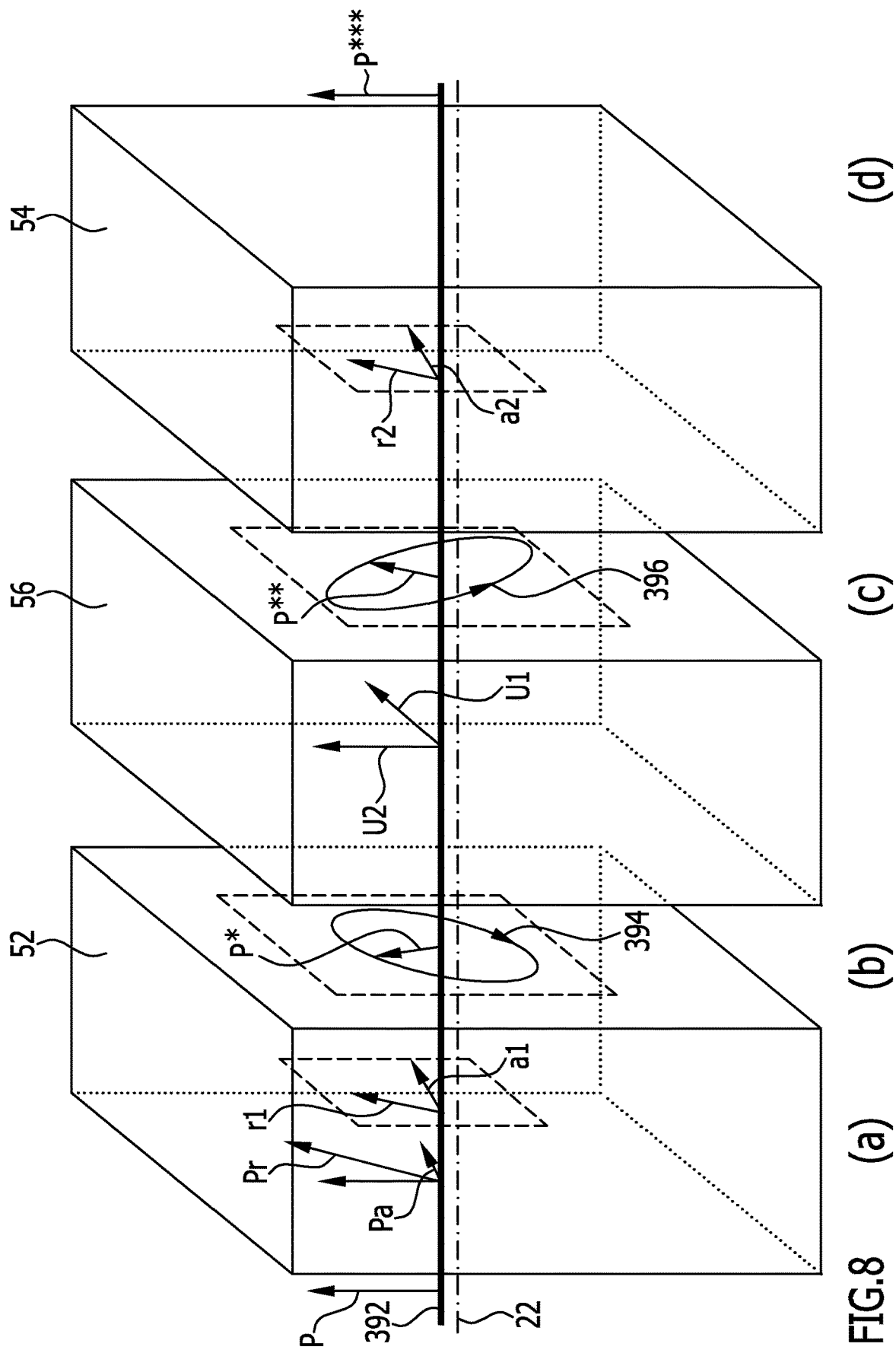
FIG. 8 shows a development of a polarization of a radiation field, which penetrates the radiation field amplifier system.

Accordingly, a component of radiation field 18 within cross sectional area 392, which is polarized in polarization direction Pr, is exposed to refractive index m1r and a component of radiation field 18 within cross sectional area 392, which is polarized in polarization direction Pa, is exposed to refractive index m1a, where polarization directions Pr and Pa point in directions r1 and a1 respectively (FIG. 8(a)).

Due to the differing refractive indices, to which the components of radiation field 18 are exposed, optical path lengths for the two components through optical device 52 differ and the two components acquire a phase shift, that is their phases relative to each other differ.

Radiation field 18, in particular within cross sectional area 392, exits optical device 52 depolarized with respect to its initial polarization, that is radiation field 18 is, when exiting optical device 52, not any more essentially linearly polarized in direction of initial polarization direction P, but has a component, which is polarized perpendicular to initial polarization direction P.

For example radiation field 18 is, when exiting optical device 52 elliptically polarized with a polarization direction P* rotating in a rotational direction 394 and a tip of a polarization vector moves along an ellipse (sketched in FIG. 8(b)).

After exiting optical device 52, radiation field 18 enters amplifying unit 56 and by penetrating amplifying unit 56 radiation field 18 is exposed to polarization depending refractive index n of amplifying unit 56.

A component of radiation field 18, which is polarized in direction U1 is exposed to refractive index n1 and a component of radiation field 18 which is polarized in polarization direction U2 is exposed to refractive index n2.

Accordingly for two components of radiation field 18 optical path lengths through amplifying unit 56 differ, so that by penetrating amplifying unit 56 these two components acquire another phase shift.

Because amplifying unit 56 is designed as half wave plate the acquired phase shift corresponds essentially to half of the periodicity of radiation field 18.

The birefringent impact of amplifying unit 56 corresponds essentially to mirroring the polarization of radiation field 18 at a plane, which is spanned by direction 58 of penetration and direction U2.

Accordingly, when exiting amplifying unit 56, radiation field 18, which has been elliptically polarized with rotating polarization direction P* when entering amplifying unit 56, in particular within cross sectional area 392, is elliptically polarized with a rotating polarization direction P**, which rotates in a rotational direction 396, where rotational direction 396 is reversed to rotational direction 394, and a tip of a corresponding polarization vector moves along an ellipse, which is mirrored to the ellipse corresponding to rotating polarization direction P* (sketched in FIG. 8(c)).

After exiting amplifying unit 56, the polarized radiation field 18 enters optical device 54 and is exposed to polarization dependent refractive index m2 and acquires another depolarization.

By penetrating optical device 54, in particular within cross sectional area 392, a component of radiation field 18, which is polarized in direction r2, is exposed to refractive index m2r and a component of radiation field 18, which is polarized in direction a2, is exposed to refractive index m2a.

Accordingly, optical path lengths for two components through optical device 54 differ, such that these two components acquire another phase shift when penetrating optical device 54.

Radiation field 18 exits optical device 54 polarized with a polarization direction P*** (sketched in FIG. 8(d)).

Due to the setup of amplifier system 20, in particular due to the arrangement of optical devices 52 and 54, amplifying unit 56 and mounting system 78, the polarization of radiation field 18 when entering amplifier system 20, that is with polarization direction P, is essentially the same as the polarization of radiation field 18 when exiting amplifier system 20 with a polarization direction P*, with these polarizations being essentially the same if the component of the radiation field 18, which is polarized in direction of initial polarization direction P, contributes at least 90% to the total radiation field 18 when exiting amplifier system 20**.

For the following reasons, polarization directions P and P*** are essentially the same.

The effect of optical device 54 to polarization field 18 is essentially the same as the effect of optical device 52 to polarization field 18.

Radiation field 18 acquires when penetrating optical device 52 a component which is polarized perpendicular to polarization direction P and by penetrating optical device 54 radiation field 18 acquires a corresponding component which is perpendicular polarized to polarization direction P, because optical device 54 is essentially built up like optical device 52 and in particular because radiation field 18 is still mostly polarized in direction of polarization direction P.

But because radiation field 18 penetrated amplifying unit 56 before entering optical device 54, the component of radiation field 18, which is induced by optical device 52 and polarized perpendicular to polarization direction P, is inverted.

In consequence, the component of radiation field 18, which is induced by optical device 52 and inverted by amplifying unit 56, essentially compensates, that is cancels, the component, which is induced by optical device 54.

Pumping device 72 comprises a source of energy and provides energy to amplifying unit 56 for amplifying radiation field 18.

For example pumping device 72 comprises a source, which generates a pumping radiation field 412 and pumping radiation field 412 penetrates amplifying unit 56, in particular solid body 312.

For example pumping radiation field 412 is introduced to amplifying unit 56 oblique to direction 58 of penetration of radiation field 18 such that pumping radiation field 412 penetrates solid body 312 in region 132 of penetration but outside of solid body 312 radiation field 18 and pumping radiation field 412 do not run through each other.

Preferably, pumping device 72 comprises a multiple path arrangement for guiding pumping radiation field 412 several times through solid body 312 to increase the efficiency of pumping by pumping radiation field 412.

When penetrating solid body 412 pumping radiation field 412 excites laser active transition in the laser active material of solid body 312 and radiation field 18 is amplified by stimulated emission of these excited laser active transitions.

Heat dissipation system 74 comprises a first heat spreading element 512 and a second heat spreading element 514, which conduct heat from amplifying unit 56 to a first heat sink 516 and a second heat sink 518 and accordingly prevent overheating of amplifying unit 56.

For example, heat spreading element 512, 514 comprise diamond, preferably monocrystalline diamond.

In the present embodiment (FIG. 4) heat spreading elements 512 and 514 are built analogously, such that heat spreading elements 512 and 514 are described in the following together as far as it is possible and for parts of heat spreading elements 512 and 514, which are built the same, the same reference signs are used, such that the corresponding description completely applies to both heat spreading elements 512 and 514 and for corresponding parts of heat spreading elements 512 and 514, which are built differently in these elements 512 and 514, or in cases in which a particular part of either first heat spreading element 512 or second heat spreading element 514 are meant, a suffix I is added to the corresponding reference sign to designate the corresponding part as a part of first heat spreading element 512 and a suffix II is added to the corresponding reference sign to designate the corresponding part as a part of second heat spreading element 514.

In the present embodiment heat spreading element 512 corresponds to optical element 212 and heat spreading element 514 corresponds to optical element 214 such that regarding the description of heat spreading elements 512, 514 it is completely referred to the description of optical elements 212, 214 and vice versa.

Figure 9:
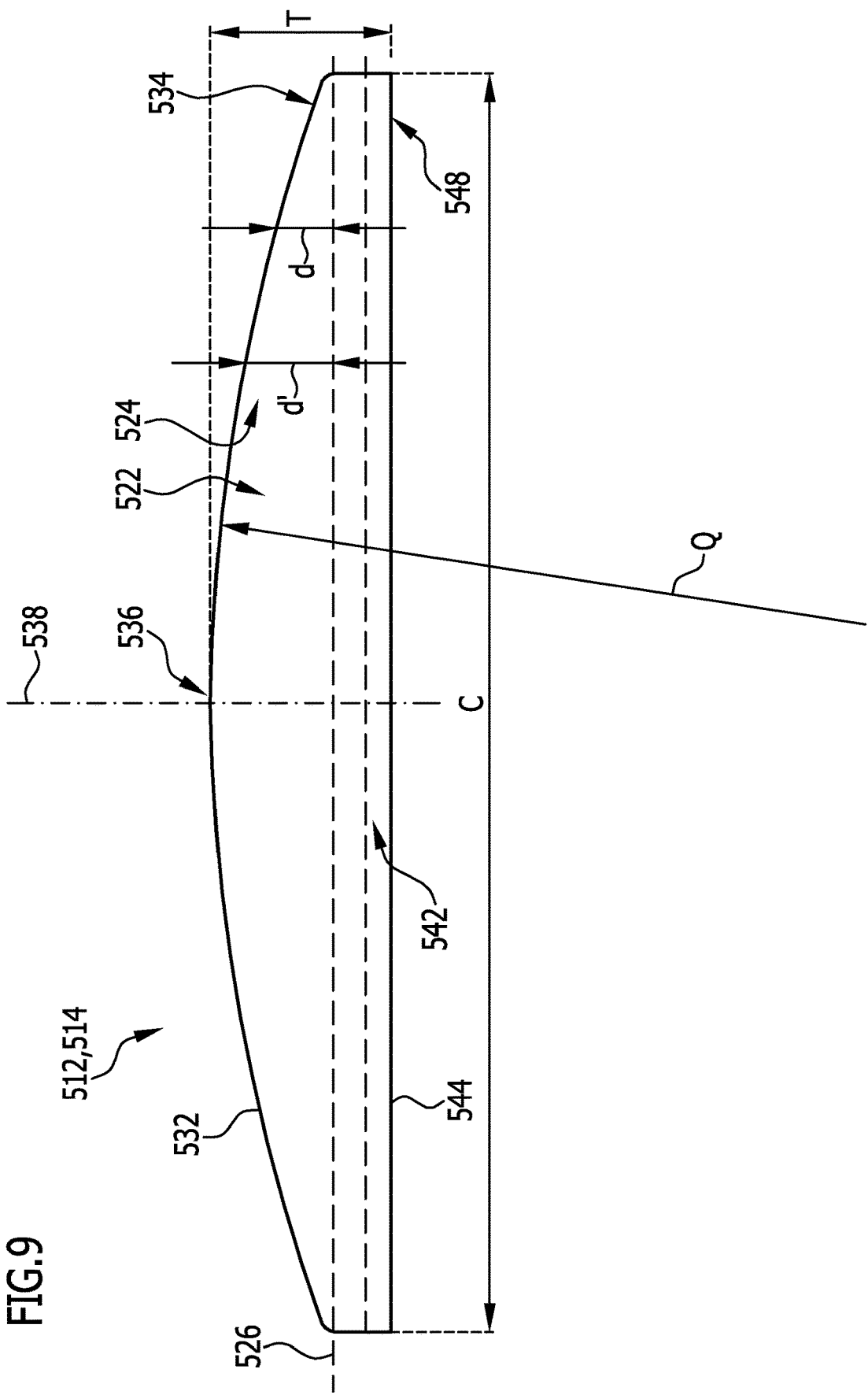

Heat spreading element 512, 514, exemplarily shown in FIG. 9, comprises a contact part 522, which is in thermal contact with amplifying unit 56, in particular with solid body 312.

Within a rising area 524 contact part 522 rises over a geometrical reference plane 526, such that a contact surface 532 of heat spreading element 512, 514 at contact part 522 has within rising area 524 different distances d, d' from geometrical reference plane 526 at different positions in rising area 524.

Contact part 522 is thinnest in an outer area 534 and is thickest in a central area 536 with a thickness of contact part 522 being for example measured with respect to geometrical reference plane 526 and in particular in a part of outer area 534 contact surface 532 is at the level of geometrical reference plane 526.

Through central area 536 a central axis 538 runs, which is for example perpendicular to geometrical reference plane 526, and outer area 534 is at a distance from central axis 538 and preferably contact part 522 is rotational symmetrical to central axis 538.

Preferably, central axis 538 is essentially parallel to optical axis 22, that is an angle between axes 538 and 22 is smaller than 10°, in particular smaller than 3°, preferably smaller than 1°.

Outer area 534 in particular surrounds central area 536 and runs around central axis 538.

Contact part 522 becomes thicker, in particular continuously thicker, upon approaching central area 536 from outer area 534 that is upon decreasing the radial distance to central axis 538.

Accordingly, contact surface 532 of heat spreading element 512, 514 moves, in particular continuously increasing, away from geometrical reference plane 526 upon running from outer area 534 towards central area 536, such that the distance d between contact surface 532 and geometrical reference plane 526 increases, in particular continuously, between outer area 534 and central area 536 with the distance d being smaller in outer area 534 than in central area 536 and in particular with distance d approaching its maximal value within central area 536.

In other words a measured value of the distance d between geometrical reference plane 526 and contact surface 532 of heat spreading element 512, 514 increases, in particular continuously, upon moving a point of measurement, at which the distance d is measured, from outer area 534 towards central area 536, in particular upon moving the point of measurement radially towards central axis 538.

Contact surface 532 is curved with a radius Q of curvature and contact part 522 is within rising area 524 convex.

Radius Q of curvature is significantly larger, for example at least 2.000 times larger, than an extension C of heat spreading element 512, 514 within geometrical reference plane 526, where the distance between outer area 534 and central area 536 is for example half of the extension C, with the distance between outer area 534 and central area 536 being for example measured from central axis 538 in radial direction to the point at which contact surface 532 reaches geometrical reference plane 526, for example crosses geometrical reference plane 526.

Heat spreading element 512, 514 extends from contact part 522 across geometrical reference plane 526, in particular in axial direction of central axis 538, to a second part 542.

A thickness T of heat spreading element 512, 514 is measured from contact part 522 to second part 542.

For example the thickness T of heat spreading element 512, 514 is smaller than the extension C of heat spreading element 512, 514.

A surface 544 of heat spreading element 512, 514 at second part 542 is for example planar that is surface 544 extends essentially in a geometrical plane which in particular is parallel to geometrical reference plane 526.

A distance between surfaces 532 and 544 at contact part 522 and second part 542, respectively, corresponds essentially to thickness T of heat spreading element 512 with the distance between surfaces 532 and 544 varies along the extension of these surfaces because of the rising of contact part 522.

The variation of the distance between the surfaces 544 and 532 is however small, for example a maximal and minimal value of that distance differ with respect to a mean value of the distance by less than 1%, in particular less than 0.5%.

Further, in the present embodiment the description of optical elements 212, 214 completely corresponds to the description of heat spreading elements 512, 514 and vice versa with central axis 538I of heat spreading element 512 and central axis 528II of heat spreading element 514 corresponding to main axis 226 of optical element 212 and main axis 266 of optical element 214, respectively, and second part 542I and contact part 522I of heat spreading element 512 corresponding to first part 232 and second side 234 of optical element 212 as well as contact part 522II and second part 542II of heat spreading element 514 corresponding to first part 272 and second part 274 of optical element 214.

Mounting system 78 acts on heat spreading element 512, 514, in particular on an impact area 548, to hold heat spreading element 512, 514 in its position and to press heat spreading element 512, 514 against amplifying unit 76.

Preferably, impact area 548 runs in a radial distance around central axis 538.

In particular, impact area 548 encircles region 132 of penetration.

Heat spreading element 512 is pressed by mounting system 78 with contact part 522I against amplifying unit 56, in particular against first side 322 of solid body 312 and second heat spreading element 514 is pressed by mounting system 78 with contact part 522II against amplifying unit 56, in particular against second side 324 of solid body 312.

A loading element 612 of mounting system 78 acts on heat spreading element 512 to press heat spreading element 512 with a contact area 622 against amplifying unit 56 and a loading element 614 of mounting system 78 acts on heat spreading element 514 to press heat spreading element 514 with a contact area 624 against amplifying unit 56.

Loading elements 612 and 614 are built analogously and act in an analogous way on heat spreading elements 512 and 514, respectively, such that these elements and their action on heat spreading elements 512 and 514 are described together as far as it is possible and for parts of loading elements 612 and 614, which are built the same, the same reference signs are used with the corresponding description completely applies to both loading elements 612, 614 and where loading elements 612, 614 are different or where the description distinguishes between loading elements 612 and 614 a suffix I at a reference sign is used to indicate the corresponding part as a part of loading element 612 and a suffix II at the reference sign indicates the corresponding part as a part of loading element 614.

In the present embodiment, loading element 612 corresponds to load element 362 and loading element 614 corresponds to load element 364, such that regarding the description of loading element 612 and 614 it is also completely referred to the description of load elements 362 and 364 and vice versa.

In particular, loading elements 612, 614 are also part of said heat dissipation system 74 and conduct heat from said heat spreading elements 512, 514 to a cooling system.

For example said loading elements 612, 614 comprise diamond, preferably polycrystalline diamond.

Heat spreading element 512, 514 is aligned, such that it is pressed with its central area 536 against amplifying unit 56, in particular against side 322, 324 of solid body 312, such that central area 536I of heat spreading element 512 overlaps with contact area 622 between heat spreading element 512 and amplifying unit 56 and central area 536II of heat spreading element 514 overlaps with contact area 624 between heat spreading element 514 and amplifying unit 56.

Because heat spreading element 512, 514 is pressed with its contact part 522 against amplifying unit 56 the distance d between contact surface 532 and geometrical reference plane 526 is reduced with respect to an unloaded state, that is in particular an unpumped state and an external force free state.

Because of the non-planar contact surface 532 of contact part 522, a partial force acting between a partial area of contact part 522 and amplifying unit 56 differs for different partial areas, such that a non-uniform pressure profile develops in contact area 622, 624 between heat spreading element 512, 514 and amplifying unit 56 and furthermore the distance d between contact surface 532 and geometrical reference plane 526 gets non-uniformly smaller across contact part 522.

Due to the non-planar contact surface 532 contact part 522 adheres to amplifying unit 56, in particular to solid body 312, that is contact part 522 is closely attached to solid body 312 with a particular smooth, distortion free interface between contact part 522 and solid body 312.

The force with which loading element 612, 614 presses on heat spreading element 512, 514 is guided due to the curved contact surface 532 of contact part 522 from impact area 548, which is for example opposite to outer area 534, where outer area 534 is in particular apart from solid body 312, to contact area 622, 624 and accordingly this force presses heat spreading element 512, 514 closely to amplifying unit 56.

Therefore a bending of heat spreading element 512, 514 and consequently a detachment of contact part 522 in contact area 622, 624 from amplifying unit 56 due to a turning away from, at least a part of, contact area 622, 624 induced by the bending of heat spreading element 512, 514 is avoided.

Contact areas 622 and 624 are aligned, such that they are within region 132 of penetration, so that radiation field 18 passes through contact areas 622 and 624 and accordingly through the, in particular smooth, interfaces between contact parts 522I, 522II on one hand and amplifying unit 56 on the other hand.

Accordingly, radiation field 18 penetrates heat spreading elements 512, 514.

Diffraction losses in radiation field 18 are in particular reduced due to the against amplifying unit 56 pressed contact part 522, in particular the smooth interface between contact part 522 and amplifying unit 56 within contact area 622, 624.

By adjusting the strength of the force, with which heat spreading element 512, 514 is pressed against amplifying unit 56, the reduction of diffraction losses can be further reduced.

For adjusting heat spreading elements 512 and 514, in particular to adjust contact areas 622 and 624 to be aligned in region 132 of penetration, amplifier system 20 comprises an adjustment system 712, which is for example a part of mounting system 78.

Figure 3:
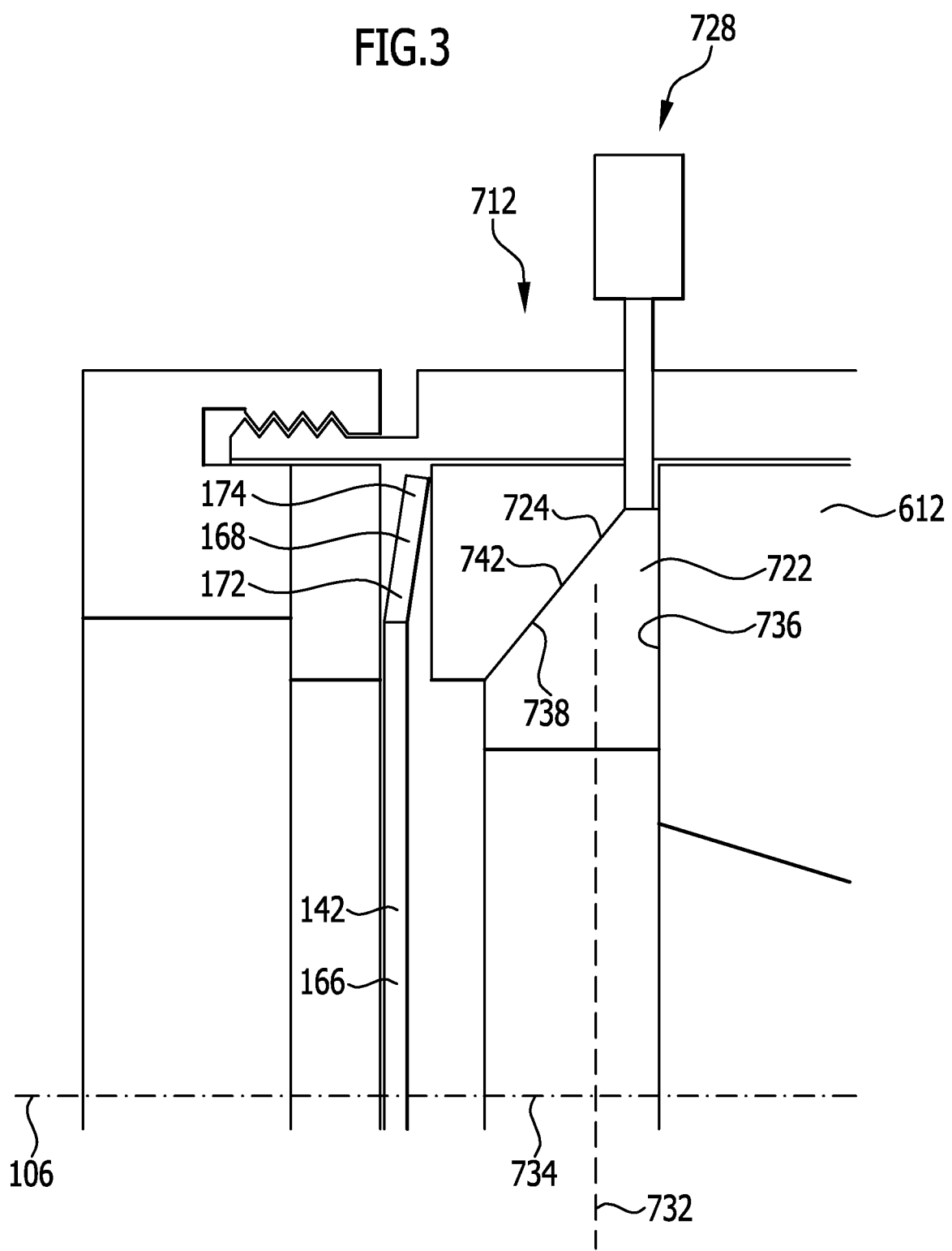
FIG. 3 shows an enlarged view of a part of the radiation field amplifier system in the area of a spring and an adjustment unit.

Adjustment system 712 comprises an adapting element 722, which sits in a seat 724, and a tuning unit 728 (FIG. 3).

Adapting element 722 is ring-like shaped and extends essentially in an geometrical adjustment plane 732, which is perpendicular to an adjustment axis 734, and adjustment axis 734 essentially coincides in particular with main axes 226, 266 and housing axis 106.

Adapting element 722 runs around adjustment axis 734 with a surface at a first side 736 running essentially parallel to geometrical adjustment plane 732 and a surface at a second side 738 running oblique to geometrical adjustment plane 732 and consequently oblique to the surface at first side 736, such that adapting element 722 gets narrower with increasing radial distance from adjustment axis 734.

Second side 738 of adapting element 722 sits in seat 724 and first side 736 is linked to loading element 612.

Seat 724 is loaded on one side by spring 142 and receives adapting element 722 at a supporting side 742, the surface of which is in particular accordingly shaped to the surface of adapting element 722 at second side 738 that is correspondingly angled to geometrical adjustment plane 732.

Tuning unit 728 acts on adapting element 722 to tune the position of adapting element 722 in radial direction to adjustment axis 734.

For example, tuning unit 728 comprises several adjusting screws, which are connected to housing 102 and act on adapting element 722 in radial direction to adjustment axis 734.

In this way, adapting element 722 sits, in particular in axial direction to adjustment axis 734, between seat 724 and loading element 612 and is consequently a part of connection 152 actuated by force.

By tuning the position of adapting element 722 in radial direction of adjustment axis 734, the distance between seat 724 and loading element 612 is adjusted, due to the narrowing of adapting element 722 in radial direction of adjustment axis 734.

With tuning unit 728, the radial position of adapting element 722 at different positions around adjustment axis 734 is tunable, for example by several adjusting screws in housing 102.

Accordingly loading element 612 is tilted with respect to geometrical adjustment plane 732 and transfers this tiltment to heat spreading element 512 and the tiltment of heat spreading element 512 results in a tiltment of contact part 522I of heat spreading element 512 and accordingly contact area 622 between contact part 522I and amplifying unit 56 is shifted.

In another embodiment, a resonator 900, which is exemplarily shown in FIG. 10, comprises a first mirror 912 and a second mirror 914 and an amplifier system 20' according to the preceding embodiment.

A radiation field 18' is reflected by first mirror 912 towards second mirror 914 and is reflected by second mirror 914 towards first mirror 912.

Accordingly radiation field 18' extends in between first mirror 912 and second mirror 914 and amplifier system 20' is located between first mirror 912 and second mirror 914, such that radiation field 18' penetrates amplifier system 20' when passing from one of the mirrors 912, 914 to the other mirror 912, 914.

In particular first mirror 912 is highly refractive, such that most of radiation field 18' is reflected, for example at least 99% of radiation field 18' are reflected by first mirror 912.

Second mirror 914 is partially reflective, such that a part of radiation field 18' is reflected by second mirror 914 and a part of radiation field 18' transmits through second mirror 914 and converts to a provided radiation field 28'.

The work leading to this invention has received funding from the European communities 7$^{th}$ framework program (FP7/2007-2013) under grant agreement number FP7-ICT-619177-TiSa TD.

What is claimed is:

1. Radiation field amplifier system for a radiation field, comprising:
    an amplifying unit and a heat dissipation system with one heat spreading element or several heat spreading elements,
    wherein said one heat spreading element or at least one of said several heat spreading elements of said heat dissipation system is pressed with a contact surface within a contact area directly against said amplifying unit, said contact surface being in contact with the amplifying unit entirely within the contact area and said contact surface rises at least within said contact area starting from a geometrical reference plane in direction towards said amplifying unit and a distance d between said contact surface and said geometrical reference plane attains its largest value within a central area which is arranged inside said contact area and, within said contact area, said distance d is smaller outside said central area than inside said central area,
    wherein:
    a region of penetration of said radiation field passes through said contact area, within said contact area said one heat spreading element or at least one of said several heat spreading elements is pressed against said amplifying unit, said amplifier system comprises a source of a pumping radiation field and said pumping radiation field provides pumping energy to said amplifying unit, and a region of penetration of said pumping radiation field passes through said contact area.

2. Radiation field amplifier system according to claim 1, wherein said amplifying unit is clamped in between a first and a second heat spreading element of said heat dissipation system.

3. Radiation field amplifier system according to claim 1, wherein a first contact area between a first heat spreading element and said amplifying unit and a second contact area between a second heat spreading element and said amplifying unit are arranged on opposite sides of said amplifying unit.

4. Radiation field amplifier system according to claim 1, wherein, in an unloaded state, the distance d between the contact surface and the geometrical reference plane of said one heat spreading element or of at least one of said several heat spreading elements increases from an outer area of said heat spreading element towards the central area of said heat spreading element and that said outer area surrounds said central area.

5. Radiation field amplifier system according to claim 1, wherein the geometrical reference plane of said one heat spreading element or of at least one of said several heat spreading elements runs essentially perpendicular to an optical axis of said radiation field amplifier system.

6. Radiation field amplifier system according to claim 1, wherein the contact surface of said one heat spreading element or of at least one of said several heat spreading elements is, in an unloaded state, curved, with a radius Q of curvature of said contact surface being larger than 0.5 meter and/or smaller than 50 meter.

7. Radiation field amplifier system according to claim 1, wherein a ratio C/Q of an extension C, which is measured transverse to an optical axis of said radiation field amplifier system, of said one heat spreading element or of at least one of said several heat spreading elements, to the radius Q of curvature of the contact surface of said heat spreading element is, in an unloaded state, larger than 0.0002 and/or is smaller than 0.1.

8. Radiation field amplifier system according to claim 1, wherein a ratio Q/T of the radius Q of curvature of the contact surface of said one heat spreading element or of at least one of said several heat spreading elements, to a thickness T, which is measured in axial direction with respect to an optical axis of said radiation field amplifier system, of said heat spreading element is, in an unloaded state, larger than 1.000 and/or is smaller than 40.000.

9. Radiation field amplifier system according to claim 1, wherein said one heat spreading element or at least one of said several heat spreading elements is spring actuated.

10. Radiation field amplifier system according to claim 1, wherein a strength of a force with which said one heat spreading element or at least one of said several heat spreading elements is pressed against said amplifying unit is adjustable by a mounting system and is adjustable before and/or during and/or after operation of said radiation field amplifier system.

11. Radiation field amplifier system according to claim 1, wherein a strength of the force with which said one heat spreading element or at least one of said several heat spreading elements is pressed against said amplifying unit is adjusted to increase the efficiency of said radiation field amplifier system.

12. Radiation field amplifier system according to claim 1, wherein said radiation field amplifier system comprises an adjustment unit, which enables an adjustment of said one heat spreading element or of at least one of said several heat spreading elements, to adjust said one or at least one adjustable heat spreading element into a desired position, where in said desired position said region of penetration of said radiation field passes through the contact area between said one or at least one adjustable heat spreading element and said amplifying unit.

13. Radiation field amplifier system according to claim 12, wherein in the desired position a region of penetration of said radiation field passes through the contact area between said one or at least one adjustable heat spreading element and said amplifying unit.

14. Radiation field amplifier system according to claim 12, wherein in said desired positions the contact areas of at least two adjustable heat spreading elements are aligned with respect to each other.

15. Radiation field amplifier system according to claim 12, wherein in said desired positions said pumping radiation field passes through the contact areas between said adjustable heat spreading elements and said amplifying unit.

16. Radiation field amplifier system according to claim 12, wherein said adjustment unit enables an adjustment of at least one optical element of at least one optical device.

17. Radiation field amplifier system according to claim 1, wherein said radiation field amplifier system comprises a first optical device and a second optical device and at least one of said optical devices is part of said heat dissipation system.

18. Radiation field amplifier system according to claim 17, wherein said optical devices act birefringently on said radiation field and said birefringence in at least one of said first and said second optical devices is induced by stress and/or thermal gradients within said at least one optical device.

19. Radiation field amplifier system according to claim 17, wherein optical path lengths through at least one of said optical devices are different for two components of said radiation field, which are polarized perpendicular to each other.

20. Radiation field amplifier system according to claim 17, wherein differences in refractive indices to which components of said radiation field, which are polarized perpendicular to each other, are exposed, in said first optical device and in said second optical device are essentially the same, with said differences being essentially the same, if said differences are the same or deviate from each other by at most 10%.

21. Radiation field amplifier system according claim 17, wherein at least one heat spreading element of said heat dissipation system is an element of one of said first and said second optical devices.

22. Radiation field amplifier system according to claim 1, wherein said radiation field is amplified by said amplifying unit.

23. Radiation field amplifier system according to claim 1, wherein said amplifying unit inverts a phase shift between components of said radiation field, which are polarized parallel and perpendicular to an initial polarization direction (P) of said radiation field.

24. Radiation field amplifier system according to claim 1, wherein said at least one heat spreading element is in thermal contact with one or more heatsinks.

25. Radiation field amplifier system according to claim 1, wherein a first heat spreading element is pressed within a first contact area against said amplifying unit and a second heat spreading element is pressed within a second contact area against said amplifying unit and said region of penetration of said radiation field passes through said first contact area and through said second contact area.

26. Radiation field amplifier system according to claim 2, wherein a distance d1 between a first contact surface and a first geometrical reference plane of said first heat spreading element in a first contact area and/or a distance d2 between a second contact surface and a second geometrical reference plane of said second heat spreading element in a second contact area are/is smaller in a pressed and/or pumped state than in an unpressed and/or unpumped state.

27. Radiation field amplifier system according to claim 1, wherein a radii Q of curvature of the contact surfaces of a first and a second heat spreading element differ with respect to each other.

28. Radiation field amplifier system according to claim 1, wherein an extension C, which is measured transverse to an optical axis of said radiation field amplifier system, of at least one heat spreading element, is, in an unloaded state, larger than 5 mm and/or smaller than 60 mm.

29. Radiation field amplifier system according to claim 1, wherein extensions C which are measured transverse to said optical axis of said radiation field amplifier system, of a first and a second heat spreading elements differ with respect to each other.

30. Radiation field amplifier system according to claim 1, wherein a thickness T of at least one heat spreading element, with the thickness T being measured in axial direction with respect to an optical axis of said radiation field amplifier system, is, in an unloaded state, larger than 0.3 mm and/or smaller than 5 mm.

31. Radiation field amplifier system according to claim 1, wherein a thicknesses T of a first heat spreading element and of a second heat spreading element differ with respect to each other.

32. Radiation field amplifier system according to claim 1, wherein a ratio C/T of an extension C, which is measured transverse to an optical axis of said radiation field amplifier system, of at least one heat spreading element to a thickness T of the at least one heat spreading element, which is measured in axial direction with respect to said optical axis of said radiation field amplifier system, is, in an unloaded state, larger than 4 and/or smaller than 22.

33. Radiation field amplifier system according to claim 1, wherein a mounting system exerts a force on at least one heat spreading element.

34. Radiation field amplifier system according to claim 33, wherein said force, which is exerted on at least one heat spreading element, is exerted by a force exerting unit, with which a strength of said force is adjustable.

35. Radiation field amplifier system according to claim 33, wherein said force, which is exerted on at least one heat spreading element, is held essentially constant.

36. Radiation field amplifier system according to claim 33, wherein the force exerting unit comprises at least one piezoelectric element.

37. Radiation field amplifier system according to claim 33, wherein the force exerting unit comprises at least one spring.

38. Radiation field amplifier system for a radiation field comprising:
an amplifying unit and a heat dissipation system with one heat spreading element or several heat spreading elements,
wherein:
said one heat spreading element or at least one of said several heat spreading elements of said heat dissipation system is pressed with a contact surface within a contact area directly against said amplifying unit,
said contact surface being in contact with the amplifying unit entirely within the contact area, and
in an unloaded state, the distance d between the contact surface and a geometrical reference plane of said one heat spreading element or of at least one of said several heat spreading elements increases upon decreasing a radial distance to an optical axis of said radiation field amplifier system,
wherein:
a region of penetration of said radiation field passes through said contact area, within said contact area said one heat spreading element or at least one of said several heat spreading elements is pressed against said amplifying unit,
said amplifier system comprises a source of a pumping radiation field and said pumping radiation field provides pumping energy to said amplifying unit, and
a region of penetration of said pumping radiation field passes through said contact area.

39. Radiation field amplifier system according to claim 38, wherein the distance d between the contact surface and the geometrical reference plane of said one heat spreading element or of at least one of said several heat spreading elements in said contact area is smaller in a pressed and/or pumped state than in an unpressed and/or unpumped state.

40. Radiation field amplifier system according to claim 38, wherein the optical axis of said radiation field amplifier system runs through the central area of said at least one heat spreading element.

* * * * *